(12) United States Patent  (10) Patent No.: US 7,903,274 B2
Ohtani  (45) Date of Patent: Mar. 8, 2011

(54) IMAGE PROCESSING APPARATUS THAT GENERATES DATA DISPLAYED AS AN ADDRESS BOOK

(75) Inventor: Yohko Ohtani, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 978 days.

(21) Appl. No.: 11/681,545

(22) Filed: Mar. 2, 2007

(65) Prior Publication Data

US 2007/0216960 A1 Sep. 20, 2007

(30) Foreign Application Priority Data

Mar. 14, 2006 (JP) ................................ 2006-069682
Dec. 15, 2006 (JP) ................................ 2006-338025

(51) Int. Cl.
*G06F 3/12* (2006.01)
*G06F 15/00* (2006.01)
(52) U.S. Cl. ...................................... 358/1.15; 358/1.13
(58) Field of Classification Search .................. 358/1.1, 358/1.9, 1.13, 1.14, 1.15, 474, 468, 400, 358/402, 442; 709/200, 223, 246; 713/201
See application file for complete search history.

(56) References Cited

U.S. PATENT DOCUMENTS

| 7,680,856 | B2 * | 3/2010 | Qureshi | 707/722 |
| 2002/0120777 | A1 * | 8/2002 | Burns et al. | 709/246 |
| 2004/0021890 | A1 * | 2/2004 | Hirai et al. | 358/1.13 |
| 2004/0042034 | A1 * | 3/2004 | Tiffan et al. | 358/1.15 |
| 2004/0186679 | A1 | 9/2004 | Ohtani | 702/122 |
| 2006/0098224 | A1 * | 5/2006 | Tsuboi et al. | 358/1.15 |
| 2006/0190496 | A1 * | 8/2006 | Tsunoda | 707/200 |

FOREIGN PATENT DOCUMENTS

| JP | 2004-236212 | 8/2004 |
| JP | 2004-272486 | 9/2004 |
| JP | 2004-272687 | 9/2004 |

* cited by examiner

*Primary Examiner* — Gabriel I Garcia
(74) *Attorney, Agent, or Firm* — Oblon, Spivak, McClelland, Maier & Neustadt, L.L.P.

(57) ABSTRACT

An image processing apparatus communicates with an information processing apparatus externally connected through a network. The image processing apparatus includes a converting unit that converts a search result of the information processing apparatus into device-specific data, and a user control unit that generates intermediate data to be displayed to a user as an address book, from the search result.

4 Claims, 20 Drawing Sheets

FIG. 9

CORRESPONDENCE RULE

| INNER-DEVICE ITEM | CORRESPONDING SERVER ATTRIBUTE |
|---|---|
| NAME | cn |
| DISPLAY NAME | sn |
| MAIL ADDRESS | mail |
| FACSIMILE NUMBER | facsimile Telephone Number |
| COMPANY | o |
| DIVISION | ou |
| . . . . . | . . . . . |

80

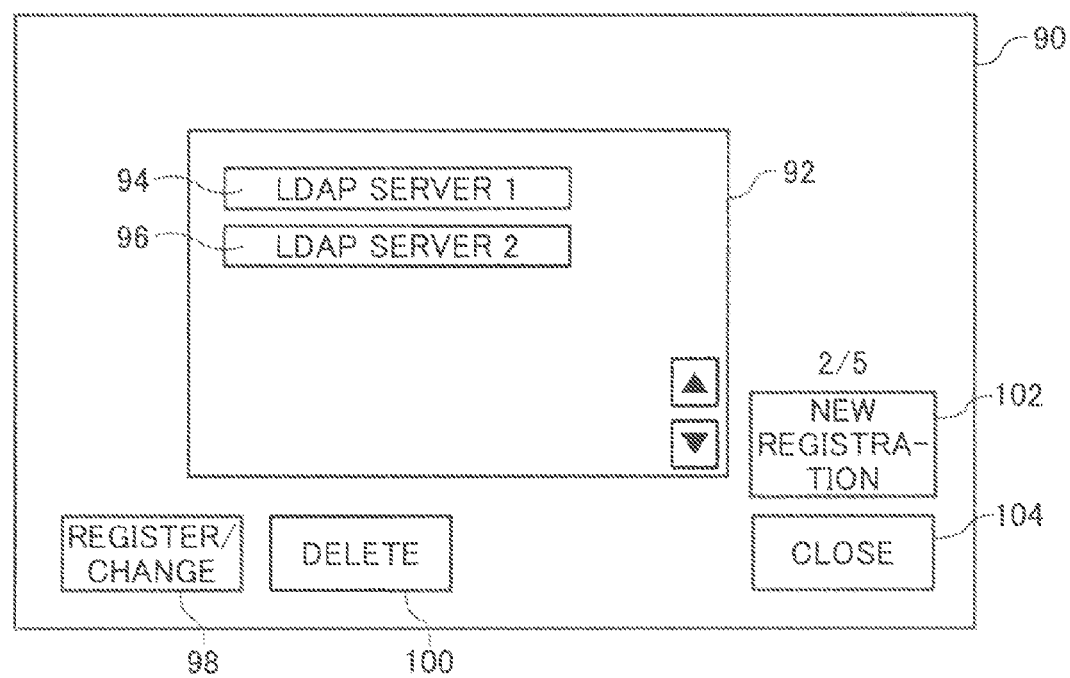

FIG. 24

IMAGE PROCESSING APPARATUS THAT GENERATES DATA DISPLAYED AS AN ADDRESS BOOK

CROSS-REFERENCE TO RELATED APPLICATIONS

The present document incorporates by reference the entire contents of Japanese priority documents, 2006-069682 filed in Japan on Mar. 14, 2006 and 2006-338025 filed in Japan on Dec. 15, 2006.

BACKGROUND OF THE INVENTION

1. Field of the Invention

The present invention relates to a technology for obtaining data to be processed by performing a communication with an image processing apparatus externally connected through a network.

2. Description of the Related Art

In recent years, with image processing apparatuses becoming more sophisticated, an image processing system has been known in which an image processing apparatus uses a network infrastructure configured, via Ethernet (registered trademark), of a local-area network (LAN), a wide-area network (WAN), or the Internet to perform data processing required for image processing. Correspondingly, image processing apparatuses tend to have various modules mounted thereon. Therefore, for example, a storage device storing data, such as an address book, is required to manage the address book or the like as efficiently as possible.

For this purpose, a technology has been known in which data with less frequency of use of the image processing apparatus is downloaded and obtained from a Lightweight Directory Access Protocol (LDAP) server externally connected thereto in response to a request from a user.

For example, Japanese Patent Application Laid-Open No. 2004-236212 discloses an image processing system in which an image processing apparatus obtains data necessary for processing from an external device externally connected thereto through a network. Also, Japanese Patent Application Laid-Open No. 2004-272687 discloses an information processing apparatus including a customizing unit that customizes a correspondence relation between obtained items and management items based on an image obtained from a sheet having described therein the correspondence relation with the management items of user information. Furthermore, Japanese Patent Application Laid-Open No. 2004-272486 discloses a network communication system in which an LDAP server is accessed for authentication even if the user gets only domain authentication.

Although such conventional technologies explained above have been known, there has been the need of an image processing apparatus allowing a user of the image processing apparatus to further efficiently perform a process of obtaining data from an apparatus, such as an externally-connected server. Also, it will be preferable to allow even data, such as an address book input by using a personal computer to be used by the image processing apparatus as its own data without requiring the user to perform a conversion process.

SUMMARY OF THE INVENTION

It is an object of the present invention to at least partially solve the problems in the conventional technology.

An image processing apparatus according to one aspect of the present invention communicates with an information processing apparatus externally connected through a network. The image processing apparatus includes a converting unit that converts a search result of the information processing apparatus into device-specific data; and a user control unit that generates intermediate data to be displayed to a user as an address book, from the search result.

An image processing method according to another aspect of the present invention includes causing an image processing apparatus or an information processing apparatus externally connected through a network to search for an address; starting an application unit that provides a function of the image processing apparatus while the information processing apparatus is requested to search for the address; receiving a search result from the information processing apparatus; generating intermediate data by applying a converting unit that converts the search result into device-specific data; and generating the device-specific data for displaying an address book by coupling a user code for performing an access control to the address book for each user with the intermediate data.

A computer program product according to still another aspect of the present invention includes a computer-usable medium having computer-readable program codes embodied in the medium that when executed cause a computer to execute converting a search result of an information processing apparatus that is externally connected through a network into device-specific data; generating intermediate data to be displayed to a user as an address book, from the search result; and providing a function of the image processing apparatus to the user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a drawing of a correspondence rule according to the embodiment;

FIG. 15 is a drawing of a screen display displayed on a touch panel of a user interface (I/F);

FIG. 16 is a drawing of a screen display displayed when the user touches a new registration field on the screen display shown in FIG. 15 to generate an input event;

FIG. 24 is a drawing of an application according to another embodiment started when the image processing apparatus is currently searching.

DETAILED DESCRIPTION OF THE PREFERRED EMBODIMENTS

Figure 1:
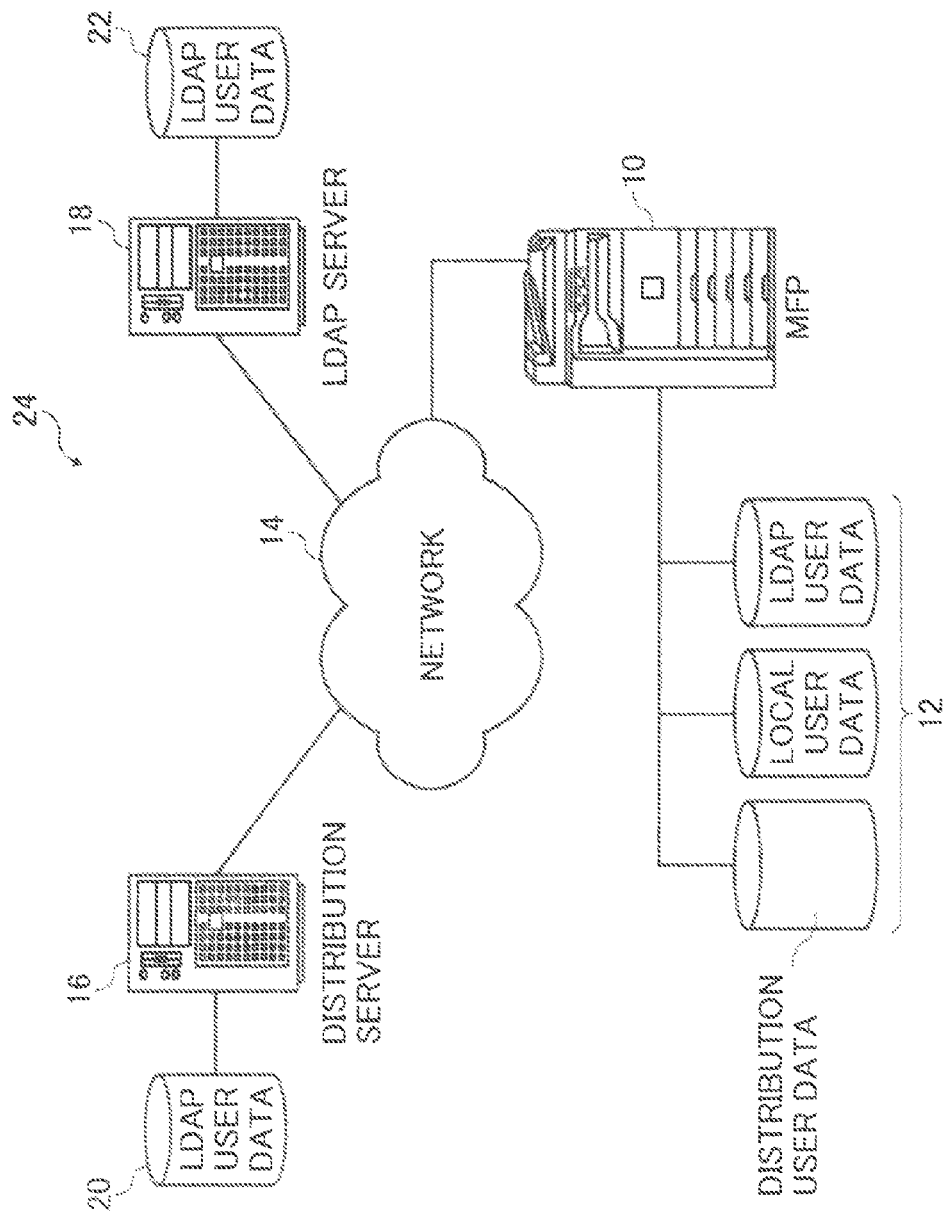
FIG. 1 is a drawing of a network system including an image forming apparatus according to an embodiment of the present invention.

Exemplary embodiments of the present invention are explained in detail below with reference to the accompanying drawings. However, the present invention is not restricted to the embodiments. FIG. 1 is a drawing of a network system including an image processing apparatus according to an embodiment of the present invention. A network system 24 shown in FIG. 1 includes an image processing apparatus 10, such as a Multifunction Product (MFP) interconnected through a network infrastructure 14, such as the Internet or a local area network, a distribution server 16, and a Light-Weight Directory Access Protocol (LDAP) server 18. The distribution server 16 collectively manage user data to distribute digital data, transmitting user data in the image processing apparatus 10 to the image processing apparatus 10, adding new user data, or correcting the existing user data, in response to a request from the image processing apparatus 10.

The distribution server 16 manages a database 20 for storing user data, searching the database 20 in response to a request from the image processing apparatus 10 and transmitting the search results to the image processing apparatus 10. The image processing apparatus 10 registers image data in the distribution server by using data obtained from the distribution server 16.

The LDAP server 18 manages user data so that the user data is in a directory structure for the image processing apparatus 10 to perform, through a network 14, processes, such as facsimile transmission and mail transmission. Upon receiving a search request from the image processing apparatus 10 complying with Request for Comments (RFC) 2251 as a request packet, the LDAP server 18 searches data managed to comply with ITU-T Recommendations X.500 and generates a response packet corresponding to the search request for transmission to the image processing apparatus 10. In addition, the LDAP server 18 manages a database 22, where user data generated to comply with ITU-T Recommendations X.500 is stored.

The image processing apparatus 10 receives a response packet containing the search data generated according to RFC 2251 for conversion to device-specific data complying with the image processing apparatus 10, and then stores the conversion result in a storage area 12 provided by, for example, random access memory (RAM), nonvolatile random access memory (NVRAM), flash memory, USB memory, or SD card secured for managing local user data and LDAP user data.

The image processing apparatus 10 manages distribution user data and local user data independently from each other in the storage area 12, the distribution user data having stored therein a network address, device name, electronic mail address, and others of the image processing apparatus 10. The local user data is data each of which can be separately registered by the user through the image processing apparatus 10. When a search request is issued from the user, the local user data is searched as default setting. LDAP user data can be added to the local user data after being downloaded from the LDAP server 18. Also in another embodiment, in response to a request from a specific user, the LDAP data is additionally stored in an Secure Digital (SD) card or Universal Serial Bus (USB) memory, thereby letting an image processing apparatus (not shown) other than the specific image processing apparatus 10 use data downloaded from the LDAP server 18.

Figure 2:
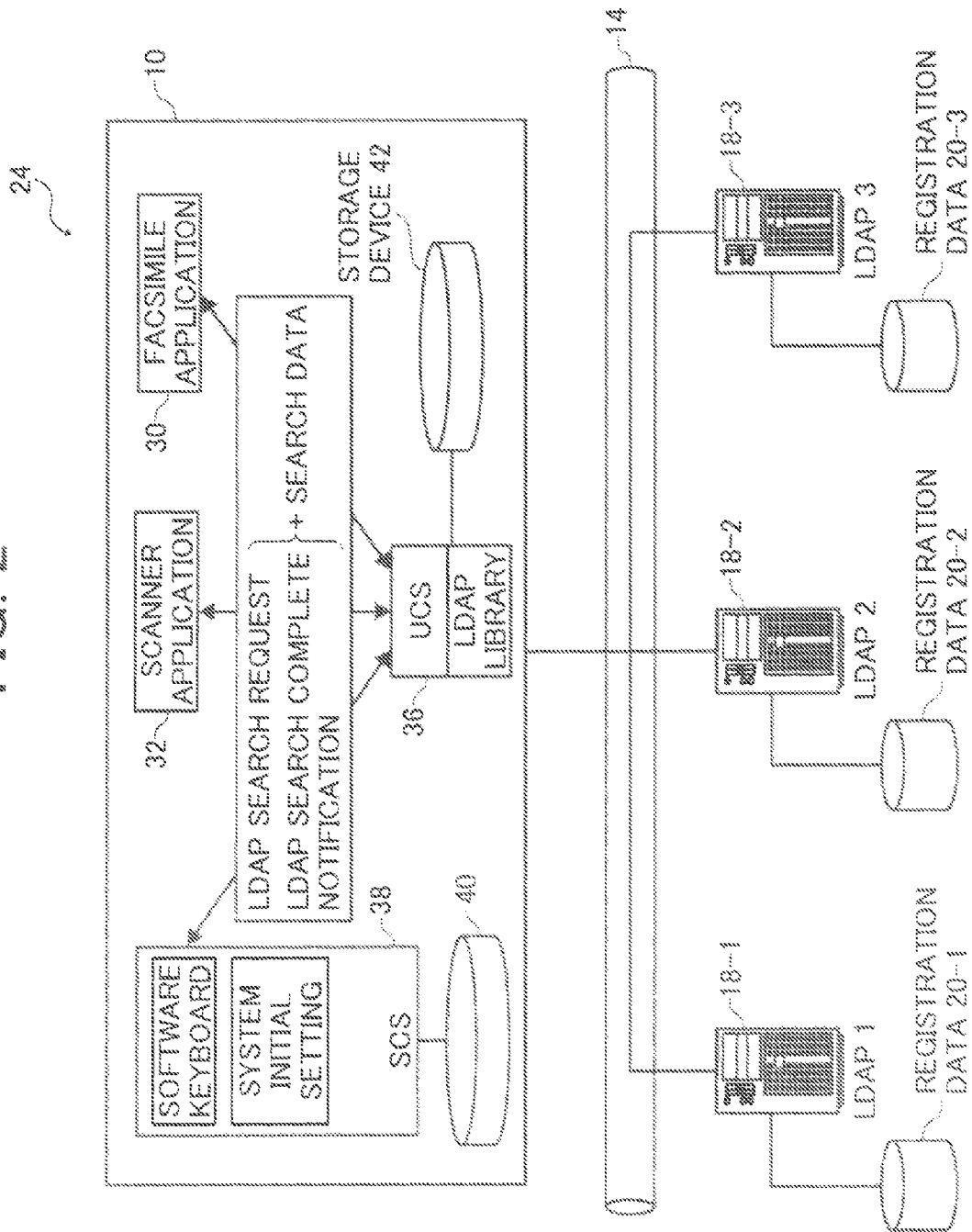
FIG. 2 is a drawing of schematic functions of the image processing apparatus according to the embodiment.

FIG. 2 is a drawing of schematic functions of the image processing apparatus 10. As shown in FIG. 2, the image processing apparatus 10 includes a plurality of applications, such as a facsimile application 30, a scanner application 32, a system control application (Service Control Service (SCS)) 38. Each application independently issues an LDAP search request to a User Control Service (UCS) 36. The UCS 36 manages the LDAP user data downloaded from the LDAP server 18 as an LDAP library in a storage device 42, such as an SD card, USB memory, NVRAM, electrically erasable programmable read-only memory (EEPROM), or erasable programmable read-only memory (EPROM). According to the embodiment, the SCS 38 also has stored in a nonvolatile storage device 40 the local user data for use by the image processing apparatus 10.

According to the embodiment, the LDAP server 18 includes three servers 18-1, 18-2, and 18-3. These LDAP servers manage registered data 20-1, 20-2, and 20-3, respectively, according to a protocol complying with ITU-T Recommendations X.500, perform searching, and transmit a response to the image processing apparatus 10.

Figure 3:
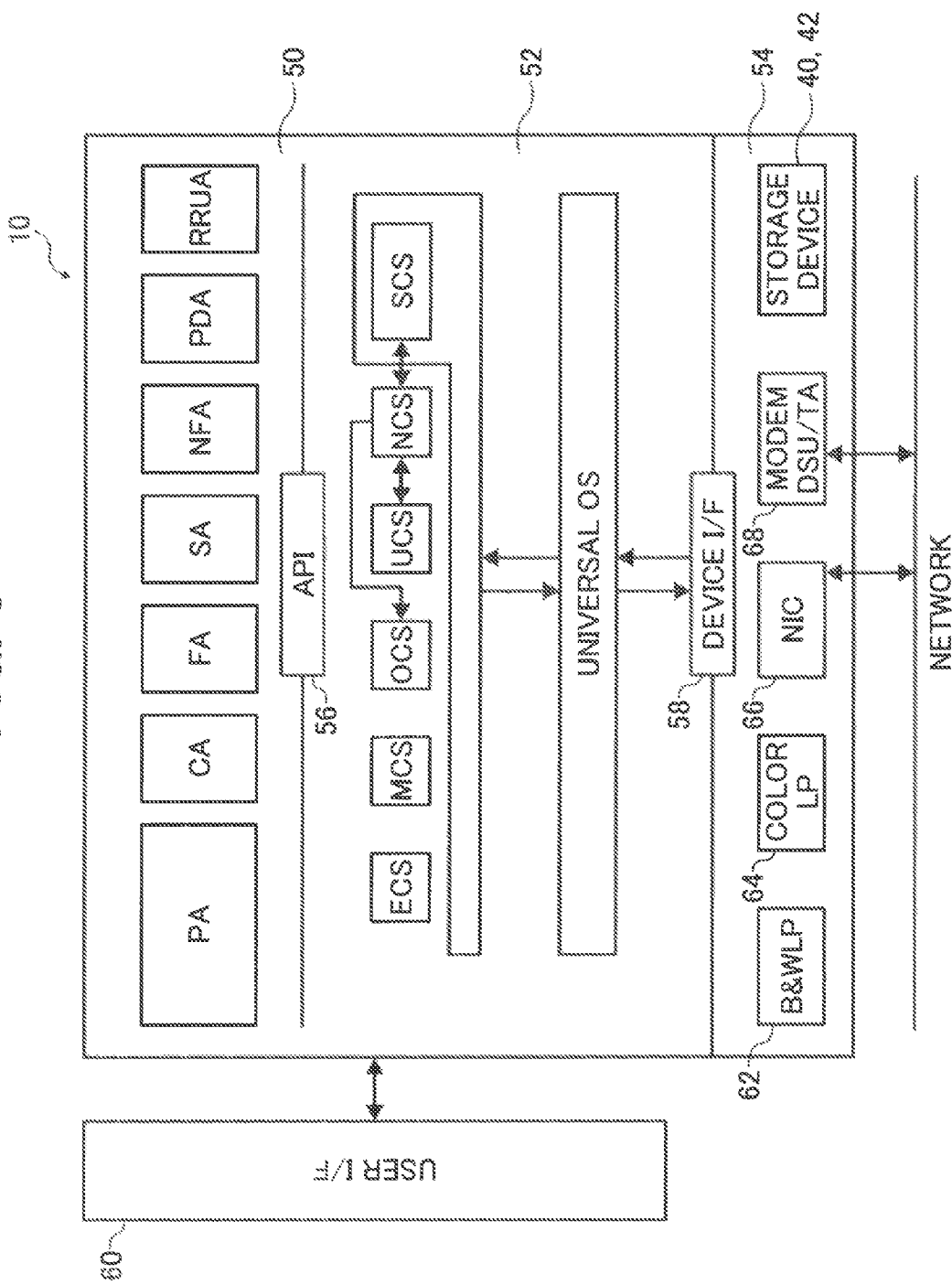
FIG. 3 is a drawing of hardware and software configuration of the image processing apparatus including a plurality of functions according to the embodiment.

FIG. 3 is a drawing of hardware and software configuration of the image processing apparatus 10 including a plurality of functions according to the embodiment. The image processing apparatus 10 includes an operation panel, such as a touch panel, or a display device, and also includes a user I/F 60 including an input key, an operation panel (a cathode-ray tube (CRT) or a liquid crystal display (LCD) panel), and others. The user I/F 60 causes, in response to a user instruction, the image processing apparatus to start functions, such as copy, facsimile, monochrome copy, and full-color copy, for provision to the user. Also, the image processing apparatus 10 may function as a network printer, which functions as a printer or facsimile in response to an input from an external computer.

Furthermore, the image processing apparatus 10 shown in FIG. 3 includes an application layer 50 of various applications for providing a plurality of functions, such as a printer application PA for providing a printer function and a copy application CA for providing a copy application. In response to an instruction from the user I/F 60, each application calls a system application forming a middleware layer 52 through an Application Program I/F (API) 56 to perform various corresponding functions. The middleware layer 52 is formed of a system application group generally referred to as a kernel, including an engine control system (ECS), a user control system (UCS), a memory control system (MCS), an operation control system (OCS), a facsimile control system (FCS), a network control system (NCS), a service control system (SCS), and other systems.

The middleware layer 52 communicates with a general-purpose operating system (OS), such as UNIX (registered trademark or LINUX, to instruct through a device I/F 58 a device layer 54, which will be explained below, from each application in the application group forming the application layer 50, and also to perform data intercommunication.

The device layer 54 of the image processing apparatus 10 shown in FIG. 3 manages a monochrome device (B&WLP) 62, a color-printer device (ColorLP) 64, a network device 66 such as a network I/F card (NIC), a facsimile modem/digital service unit (DSU)/terminal adaptor (TA) 68, and storage devices 40 and 42 such as a RAM, NVRAM, ROM, EEPROM, EPROM, and hard disk.

The network device 66 is connected to the network 14, such as a local area network (LAN), wide area network, or the Internet, through Ethernet (registered trademark) or the like. Also, the image processing apparatus 10 performs facsimile communication through a facsimile modem or the DSU/TA 68 under a protocol, such as ITU-T Recommendations T.6 or T.90. Furthermore, the image processing apparatus 10 accesses the network 14, such as the Internet, under an appropriate connection protocol, such as point-to-point protocol (PPP).

The image processing apparatus 10 according to the present embodiment can access an information processing apparatus (not shown) remotely connected through the network 14 and an LDAP server using X.500 protocol. Also, the image processing apparatus 10 can access, for example, a Web server, by using Hypertext Transfer Protocol (HTTP), Simple Object Access Protocol (SOAP), File Transfer Protocol (FTP), or the like.

More specifically, examples of a central processing unit (CPU) for use by the image processing apparatus can include PENTIUM (registered trademark), ~PENTIUM (registered trademark) IV, a CPU compatible with PENTIUM (registered trademark), or a reduced instruction set computing (RISC) chip, such as POWER PC (registered trademark) or a microprocessor without interlocked pipe stage (MIPS).

Furthermore, examples of an operating system (OS) for use can include MacOS (trademark), Windows (registered trademark), Windows (registered trademark) 200X Server, UNIX (registered trademark), AIX (registered trademark), LINUX (registered trademark), or other appropriate OS. Still further, the image processing apparatus 10 has stored therein an application program descried in an object-oriented programming language that operates on the OS explained above, such as C, C++, Visual C++, VisualBasic, Java (registered trademark), Perl, and Ruby.

In the present embodiment, the user control system (UCS 36) forms a user control unit that performs user authentication and searching. In response to the result indicating that authentication has succeeded or failed, the UCS 36 performs access control over the user accessing each function of the image processing apparatus 10 and accessing the information processing apparatus connected through the network 14. A user authentication process performed by the UCS can include verification of a user identification (ID), a password, and others, as well as encryption using Secure Socket Layer (SSL) and authentication using electronic signature. Also, in response to a request from the user, the image processing apparatus 10 can perform registration access to an externally connected server, thereby allowing the user to use data obtained from the server.

To perform registration in the present invention, the UCS 36 can include a text parser that parses intermediate data and a text editor for adding user code or electronic signature data to data obtained by the text parser and further converting the intermediate data to a structured document, such as a Hypertext Markup Language (HTML) or extensible Markup Language (XML) document. When intermediate data is generated as HTML or XML data, the image processing apparatus 10 can use Document Object Model (DOM) or Java-based Document Object Model (JDOM) to perform searching and tree display, thereby displaying the search results to the user. According to the present embodiment, the information processing apparatus is not particularly restrictive, but can include an LDAP server, an FTP server, or an HTTP server. Hereinafter, the case is explained in which an LDAP server is used as a server.

Figure 4:
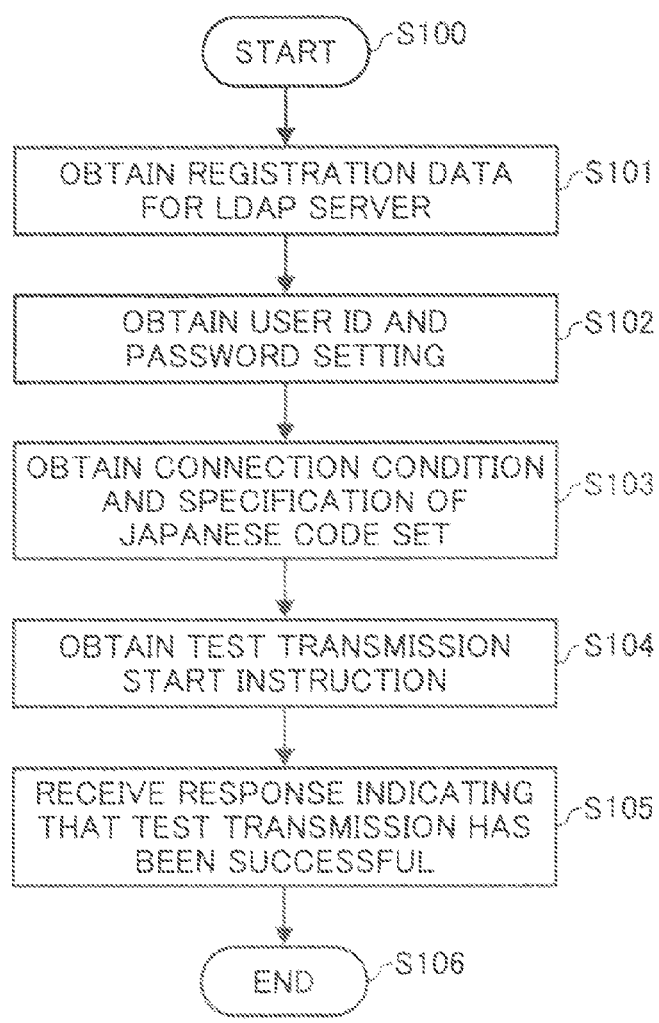
FIG. 4 is a flowchart of a process for user registration performed by the image processing apparatus on an LDAP server.

FIG. 4 is a flowchart of a process for user registration performed by the image processing apparatus 10 on an LDAP server. The process shown in FIG. 4 starts at step S100, and then at step S101, registration data for the LDAP server is received. As the registration data for the LDAP server, a name or an Internet Protocol (IP) address of the LDAP server to which new registration is to be performed can be directly entered. In the present invention, as the registration for the LDAP server, a touch-panel portion representing the name of the LDAP server displayed on the user I/F is pushed to generate an input event, and the selected name or IP address of the LDAP server can be set as a destination IP address.

At step S102, the image processing apparatus 10 causes an input screen through which a user ID and a password are entered to be displayed on the user I/F, thereby obtaining the user ID and the password from the user through the user I/F. The UCS verifies the entered user ID and password. At step S103, connection conditions for the UDAP server and specification of an encoding set are received. At step S104, the image processing apparatus 10 causes an input screen for providing a test transmission instruction to be displayed on the user I/F, thereby receiving a test transmission instruction from the user.

At step S104, upon reception of a test transmission instruction from the user, the image processing apparatus generates a test transmission packet. In test transmission packet generation, the IP address of the LDAP server is written in the destination IP address at an IP header, the IP address of the image processing apparatus 10 is written in a transmission source IP address, and a value indicating that a transmission protocol is Transmission Control Protocol/Internet Protocol (TCP/IP) is written. Also, in a TCP header, 389, which is a port number of the LDAP server, is written. In a payload, a value entered by the user seeking authentication. Here, in the present embodiment, the LDAP server can be accessed through connection via a Domain Name System (DNS server).

The LDAP server receiving a test transmission packet obtains, from the test transmission packet, the values entered by the user to determine whether access to the LDAP server is authorized. If it is determined that the user is authorized to access, the user is registered on the LDAP server and, from then on, the user is allowed to access the LDAP server without test transmission. At the same time, if it is determined that the user is authorized to access, a response packet indicating that test transmission has been successful is generated for transmission to the image processing apparatus 10. At step S105, the image processing apparatus 10 receives the response packet indicating that test transmission has been successful, and then notifies the user that access to the LDAP server is permitted. At step S106, the registration process to the LDAP server ends.

Figure 5:
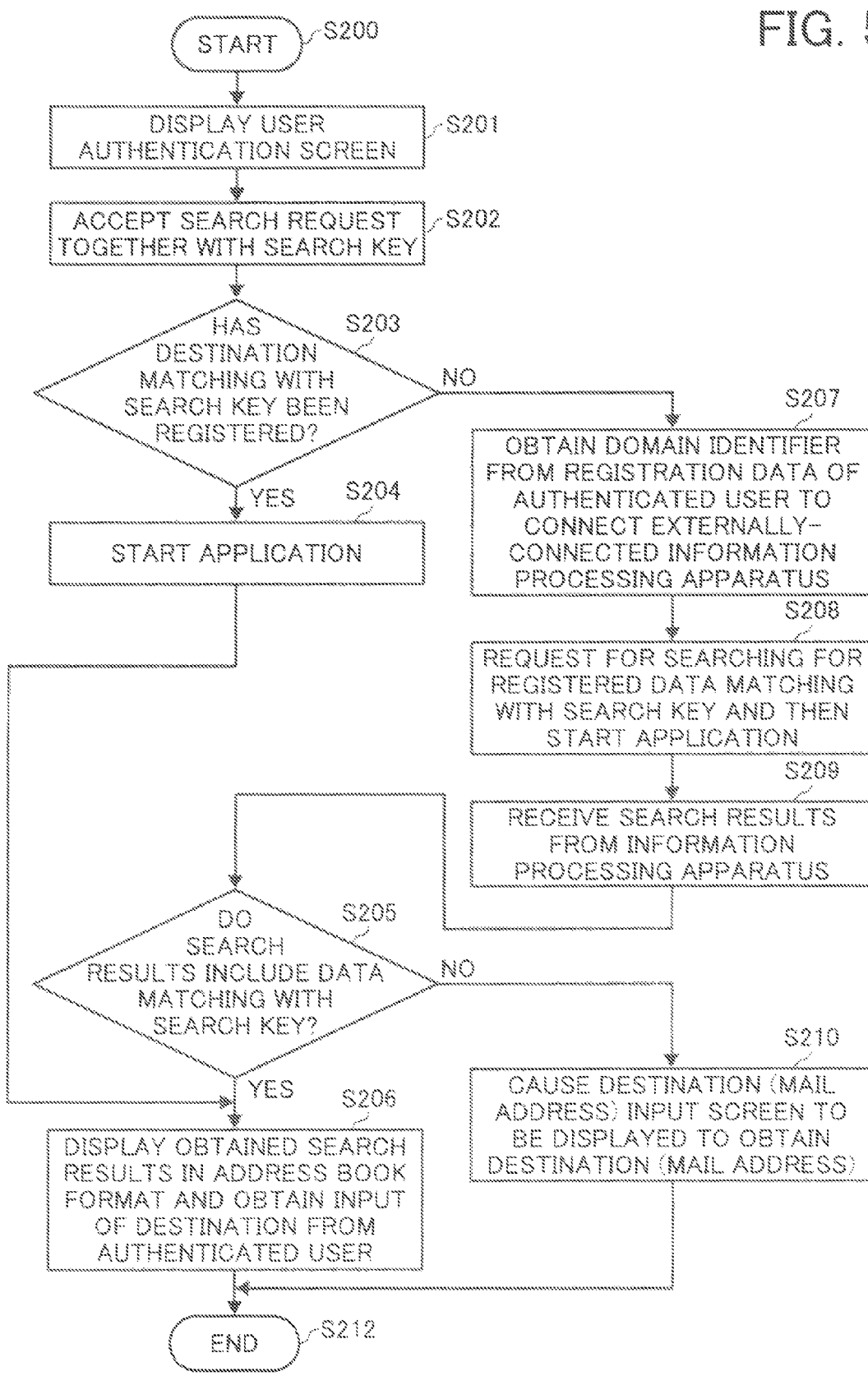
FIG. 5 is a flowchart of a process performed by a UCS according to the present invention.

FIG. 5 is a flowchart of a process performed by the UCS according to the present invention. The process shown in FIG. 5 starts at step S200, and then at step S201, a user authentication screen is displayed to the user to accept an input of a user ID and a password from the user. At step S202, a search request is accepted together with a search key. At step S203, it is determined whether data matching with the search key has already been registered in the image processing apparatus 10. If such data has been registered ("yes"), an application is started at step S204 to obtain transmission data or notify a search state to the user. Then at step S206, data found through this search is displayed as an address book, and then the procedure ends.

If it is determined at step S203 that data matching with the search key has not been registered ("no"), the procedure branches to step S207, where a domain identifier or the like is obtained from the registration data of the authenticated user to start connection to the externally connected LDAP server. At step S208, a request packet is generated for requesting the LDAP server to search for registered data matching with the search key, and is then transmitted to the LDAP server. At the same time, an application is started to notify the user of the next process or a search stage, thereby allowing a searching period to be used efficiently. Upon reception of the request packet requesting a search, the LDAP server parses the received request packet to obtain a search key, and then searches by using a command, such as "search" or "compare".

During this process, the image processing apparatus waits for reception of a response packet from the LDAP server, and therefore the amount of consumption of hardware resources for performing an application is small. Therefore, in the present invention, an appropriate application is started during this time, thereby allowing the user to use the functions of the image processing apparatus. At step S209, the image processing apparatus receives a response packet containing the search results from the LDAP server. At step S205, it is determined whether the search results include data matching with the search key. If null is returned as a search result at step S205, a screen for manually inputting a destination is displayed at step S210 to accept an input of the destination for transmission to the input destination. Then, the procedure ends at step S212.

On the other hand, if the search result does not indicate null but include data of a matching key ("yes", the procedure goes to step S206, where device-dependent intermediate data file is generated from the obtained search result and is displayed as an address book, an input of a destination from the authenticated user is accepted, and then transmission is requested. Then at step S212, the procedure ends.

Figure 6:
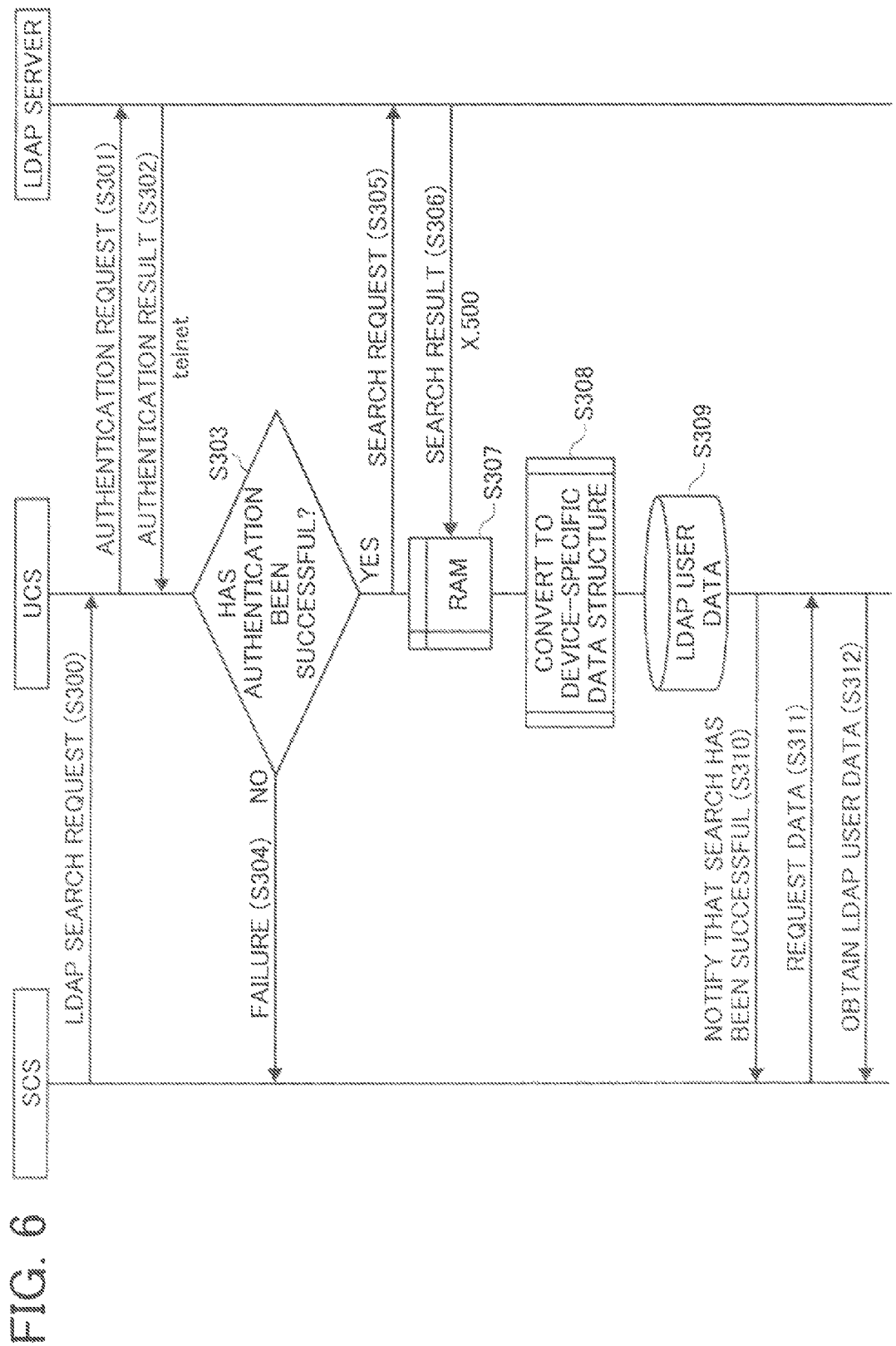
FIG. 6 is a drawing of a sequence of a transaction between the image processing apparatus and the LDAP server according to the embodiment.

FIG. 6 is a drawing of a transaction sequence between the image processing apparatus 10 and the LDAP server 18 according to the embodiment. The SCS 38 directly issues an LDAP search request to the UCS 36. The UCS 36 receiving the LDAP search request issues at step S301 an authentication request including the user ID and the password to the LDAP server, and then receives the authentication result at step S302. The authentication sequence at S301 and S302 can be performed by using any protocol, such as the telnet protocol defined in RFC 854 or Secure Shell (SSH) defined in RFC 4250 to RFC 4256.

The UCS 36 receiving the authentication result then parses the packet to determine whether authentication has been successful. If it is determined at step S303 that authentication is failed ("no"), the UCS 36 notifies the SCS 38 of failure. If it is determined at step S303 that the packet indicating that authentication has been successful is returned ("yes"), the sequence goes to step S305, where a request packet is generated by formatting a keyword and a search formula included in the LDAP search request complying with X.500 protocol and writing the results in the payload of the request packet. At step S305, the generated request packet having the Uniform Resource Locator (URL) or network address of the LDAP server 18 written in a destination address is sent to the network 14.

The LDAP server 18 receiving the request packet parses the request packet to identify the search keyword, and performs a process, such as "select" and "compare", according to the search formula to generate search results. The generated search results (the search results include a notification that no search results are found) are obtained by the UCS 36 at step S306 as a response packet. At step S307, the search results written in the payload of the response packet are stored in the RAM or the like.

Then at step S308, the UCS starts the text parser to parse the search results stored in the RAM, thereby generating intermediate data in which highly related data items are grouped together. At this time, the UCS 36 obtains security data, such as the user ID, password, electronic signature, or the like, proving a security function to the user, and then connects security code, such as user code or electronic signature, to the generated intermediate data. The UCS 36 further formats the intermediate data having the user code and security data connected together to generate device-specific data, such as comma-separated values (CSV), space delimiters, and tab delimiters.

Then, the search results formatted into the device-specific data are stored at step S309 as LDAP user data in, for example, the removable storage device 42, such as a USB memory or an SD card, in the present embodiment. The storage device 42 is removable from the image processing apparatus 10. In the present embodiment, only by connecting the storage device 42, the user can use data downloaded from the LDAP server 18 under high security on another apparatus in which the same device-specific data can be used. In this case, the user does not have to perform transaction with the LDAP server 18 again, thereby allowing efficient use of the LDAP server 18.

After the device-specific data is stored in the storage device 42, the UCS 36 issues at step S310 to the SCS 38 a notification indicating that search has been successful. The SCS 38 receiving the search success notification then issues at step S311 a data read request corresponding to the search request at S300. The SCS 38 then obtains at S312 the LDAP user data as the searched device-specific data format, thereby allowing the user to use the LDAP user data.

Figure 7:
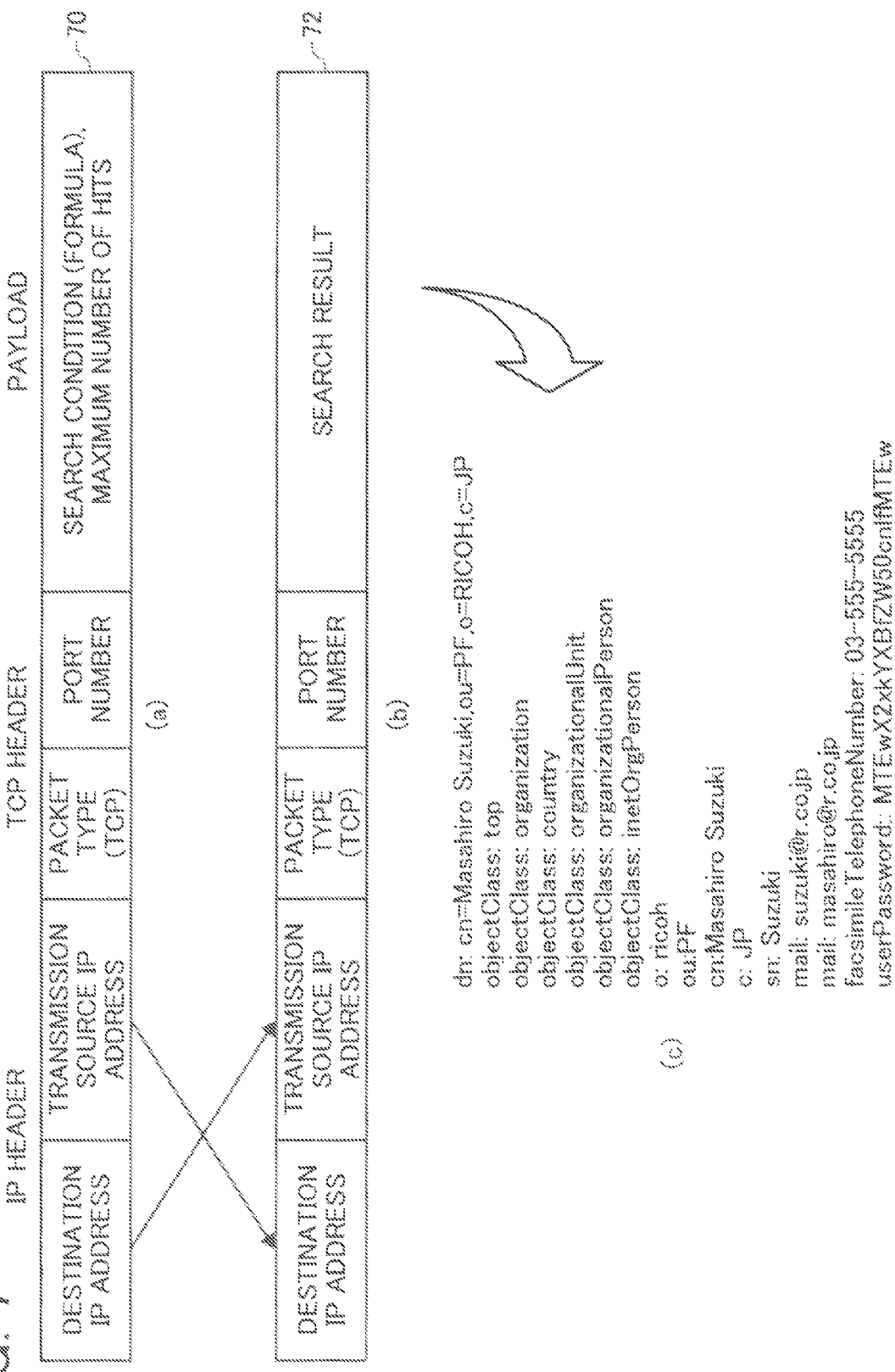
FIG. 7 is a drawing of a request packet according to the embodiment.

FIG. 7 is a drawing of a request packet 70 and a response packet 72 to be transmitted by the image processing apparatus 10 in a transaction with the LDAP server 18. The request packet 70 indicated by (a) in FIG. 7 according to the present embodiment includes an IP header, a TCP header, and a payload. In the IP header, a network address, such as an IP address of the image processing apparatus 10, is written in a transmission source address, whilst an IP address of the LDAP server 18 is written in a destination IP address. Also, in the TCP header, an identification value indicative of the packet type of the request packet and a unique port number assigned to the application are written. In the case of access to the LDAP server, 389 is written as the port number. Furthermore, in the payload, a keyword to be searched for, a search condition formula, and a specified value, such as a maximum number of hits are written. The request packet 70 indicated by (a) in FIG. 7 according to the embodiment is generated by the UCS 36, and is then sent to the network 14.

As indicated by (b) in FIG. 7, the response packet 72 is generated by the LDAP server 18 for transmission to the image processing apparatus 10 according to the embodiment. The response packet 72 has an IP header, in which a destination address of the request packet is set as a transmission source address and the transmission source address thereof is set as a destination address. Also, in a TCP header, a packet type (TCP) and a port number are written. Furthermore, the response packet 72 has a payload, in which the search results from the LDAP server 18 indicated by (c) in FIG. 7 are written and are provided by the image processing apparatus 10 for the following processing.

As indicated by (c) in FIG. 7 the search results are written in the payload according to the embodiment. The search results indicated by (c) in FIG. 7 are merely illustrative, and are not restricted to the format shown in FIG. 7. As shown in FIG. 7, the search results from the LDAP server 18 have a data configuration in which, correspondingly to object classes, types of attribute values, such as "dc" representing a domain component, "o" representing an organization, "ou" representing an organization unit, "c" representing a country, "cn" representing a common name, "sn" representing a display name, "dn" representing an organization name, and "uid" representing a user ID, are delimited by "colons", and these attributes are delimited by ",". Here, upon reception of a response packet transmitted from the LDAP server 18, the UCS 36 of the image processing apparatus 10 decodes the response packet according to appropriate encoding, such as universal multiple-octet coded character set (UCS) transformation format (UTF)-8 or Unicode to decode a text string shown in FIG. 7. According to the embodiment, an organization name of data first found is taken as an entry, and an attribute value registered for this entry is written.

Thereafter, values taken as entries for the relevant attribute values are displayed as being delimited by "colons". Also, a space or a return sign is provided at the end of the data string, and is used as a delimiter between data strings. A text parser 74 uses code of "colons", "commas", and "spaces" or "returns" as delimiters to obtain each entry item.

Figure 8:
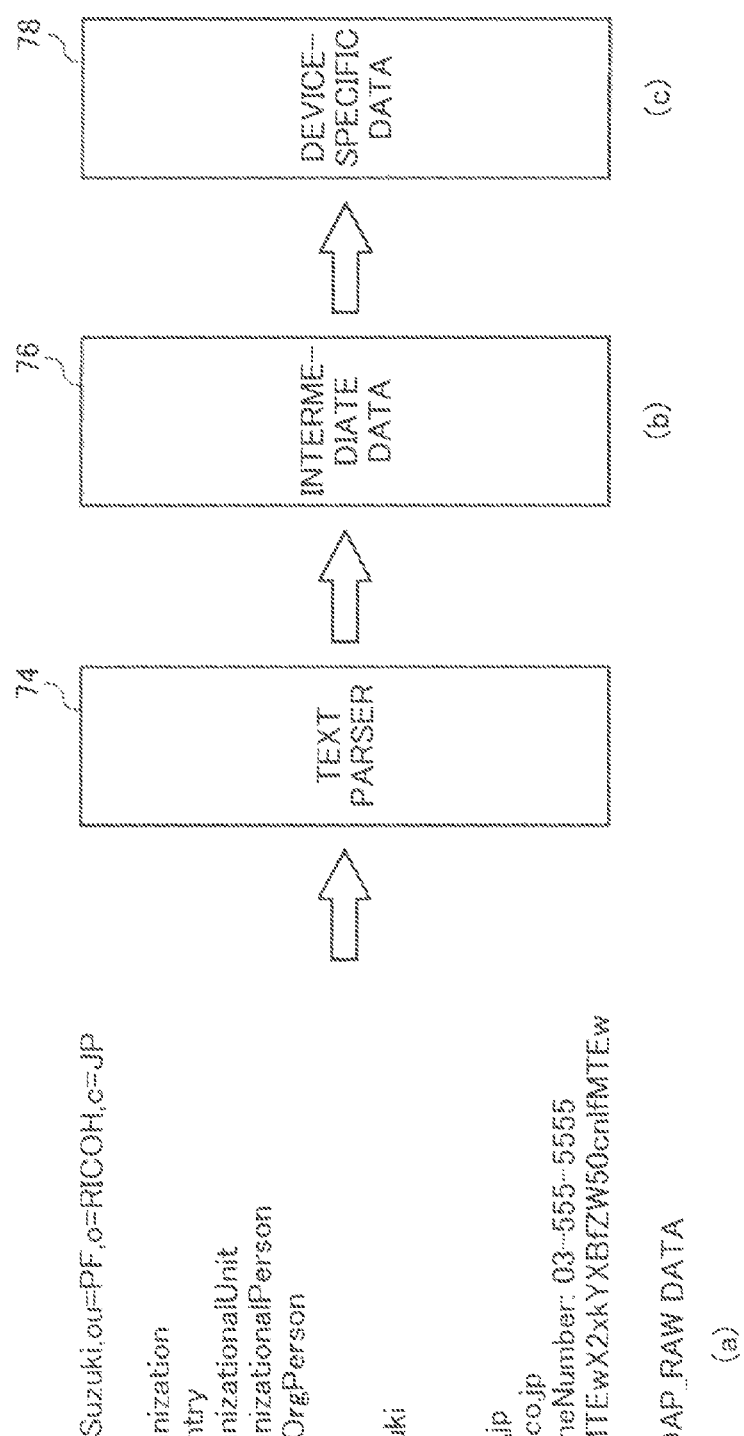
FIG. 8 is a drawing of a process in which the image processing apparatus generates intermediate data from search results contained in a response packet and takes the data as device-specific data.

FIG. 8 is a drawing of a process in which the image processing apparatus 10 generates intermediate data from the search results contained in the response packet and takes the data as device-specific data according to the embodiment. When the image processing apparatus 10 receives the search results (LDAP_RAW data), the search results are passed to the UCS 36. Upon reception of the search results, the UCS 36 calls the text parser 74 for parsing, extracts attribute values by referring to a correspondence rule, and then generates intermediate data 76. The intermediate data has a data structure so that the attribute values registered on the LDAP server 18 has a data arrangement to be registered in the image processing apparatus 10. At this stage, the UCS 36 obtains data, such as the user ID, password, or electronic signature, from storage areas, and inserts or adds the obtained data in the intermediate data at each appropriate position. Furthermore, the UCS 36 then converts the intermediate data to device-specific data 78 with CSV, space delimiters, and tab delimiters for storage in the storage device 42. Here, in another embodiment of the present invention, the UCS 36 generates a structured document, such as an HTML, XHTML, or XML document for use in searching with the use of DOM or JDOM.

FIG. 9 is a drawing of a correspondence rule 80 when intermediate data is generated from the search results (LDAP_RAW data) according to the embodiment. The correspondence rule 80 in FIG. 9 can be configured as a look-up table managed by the text parser 74 or the UCS 36, and the type and order of the entry items are not particularly restricted. However, the correspondence rule 80 preferably defines a sequence of extracting entry items to be able to search for the LDAP user data by using a search sequence similar to that when the local user data is obtained by the image processing apparatus 10.

Figure 10:
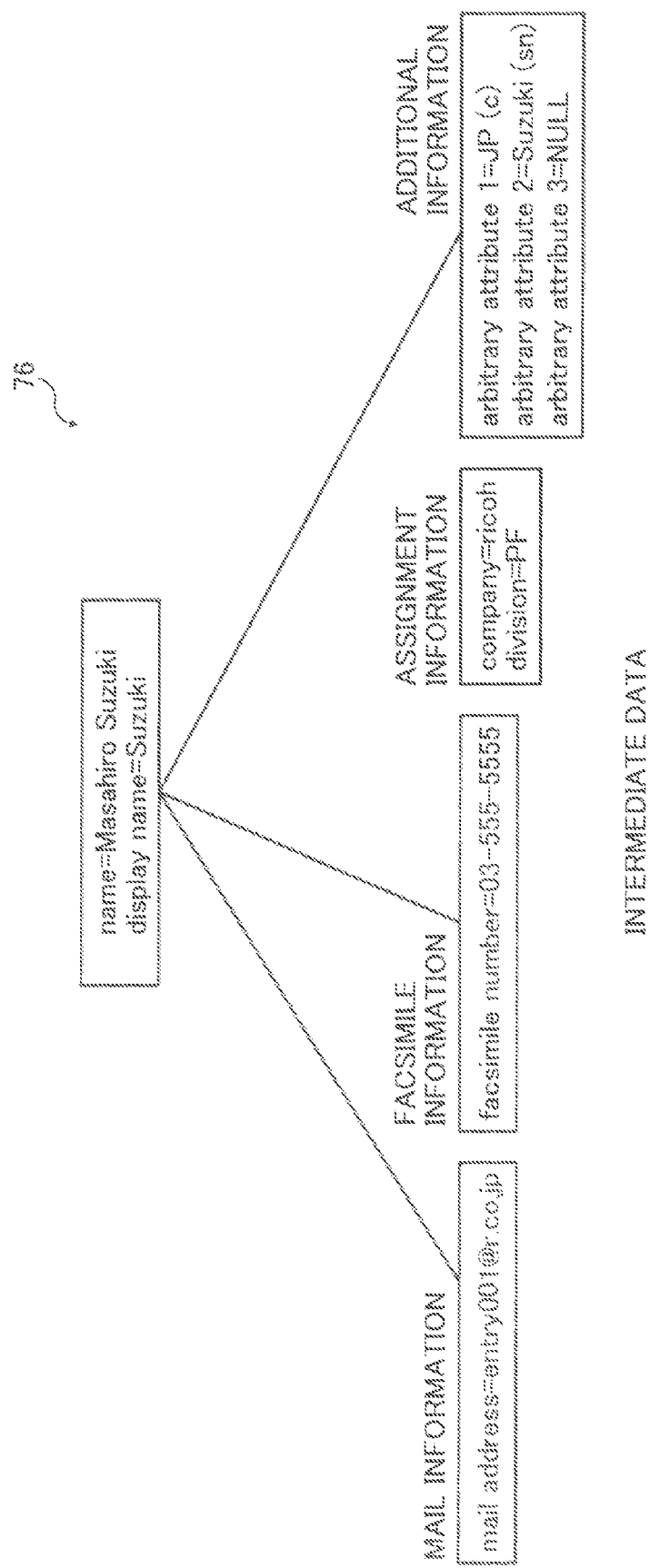
FIG. 10 is a drawing of a data structure of the intermediate data according to the embodiment.

FIG. 10 is a drawing of the intermediate data 76 according to the embodiment, which is generated so that the text parser 74 can search the search results, that is, the LDAP_RAW data, according to the correspondence rule and convert the attribute values to device-specific data of the image processing apparatus 10. The search results from the LDAP server, that is, the LDAP_RAW data, are transmitted in the format shown in FIG. 7 to the image processing apparatus 10. The UCS 36 then parses the received response packet, and then edits the LDAP_RAW data as an intermediate data file as shown in FIG. 10. The intermediate data 76 has a format with a data type, data arrangement, and data length required for the address book of the image processing apparatus 10. The image processing apparatus 10 then detects a position corresponding to the device-specific data in the intermediate data 76 shown in FIG. 10, and then inserts or adds security data, such as user code and electronic signature. The image processing apparatus 10 then generates device-specific data in a format of CSV, space delimiters, tab delimiters, or a structured document for display to the user as an address book.

The intermediate data 76 shown in FIG. 10 is registered as LDAP user data in an appropriate area of the storage device assigned to the user by the image processing apparatus 10 accepting an instruction from the user. Also in another embodiment, the intermediate data can be additionally registered in a storage device registering local user data. In such an embodiment, the device-specific data can be registered in, for example, an appropriate relational database format. The user data newly entered as local user data can be used by the user without accessing the LDAP server for subsequent searching by the user. In this case, the UCS 36 reads only an area where the intermediate data 76 has been generated, from among the local user data, and then passes the read data. At the same time, for example, security-related user code forming the local user data is used for control over access to the address book.

According to the present embodiment, the intermediate data 76 can be configured not to be stored in the nonvolatile storage device of the image processing apparatus 10 until a user instruction for instructing storage is received. In this case, at step S308 shown in FIG. 6, intercommunication with the SCS 38 can be performed to provide the user with service using the data downloaded from the LDAP server 18, and then a data deleting process can be utilized. On the other hand, in consideration of transaction cost to the LDAP server 18, if a removable nonvolatile storage device, such as an SD card or a USB memory, can be used, such an embodiment is preferably used in which the intermediate data is stored the removable nonvolatile storage device with default setting. Even in this embodiment, user code and electronic signature for accessing the LDAP server 18 is added as security data, thereby increasing security in the SD card or the USB memory.

Figure 11:
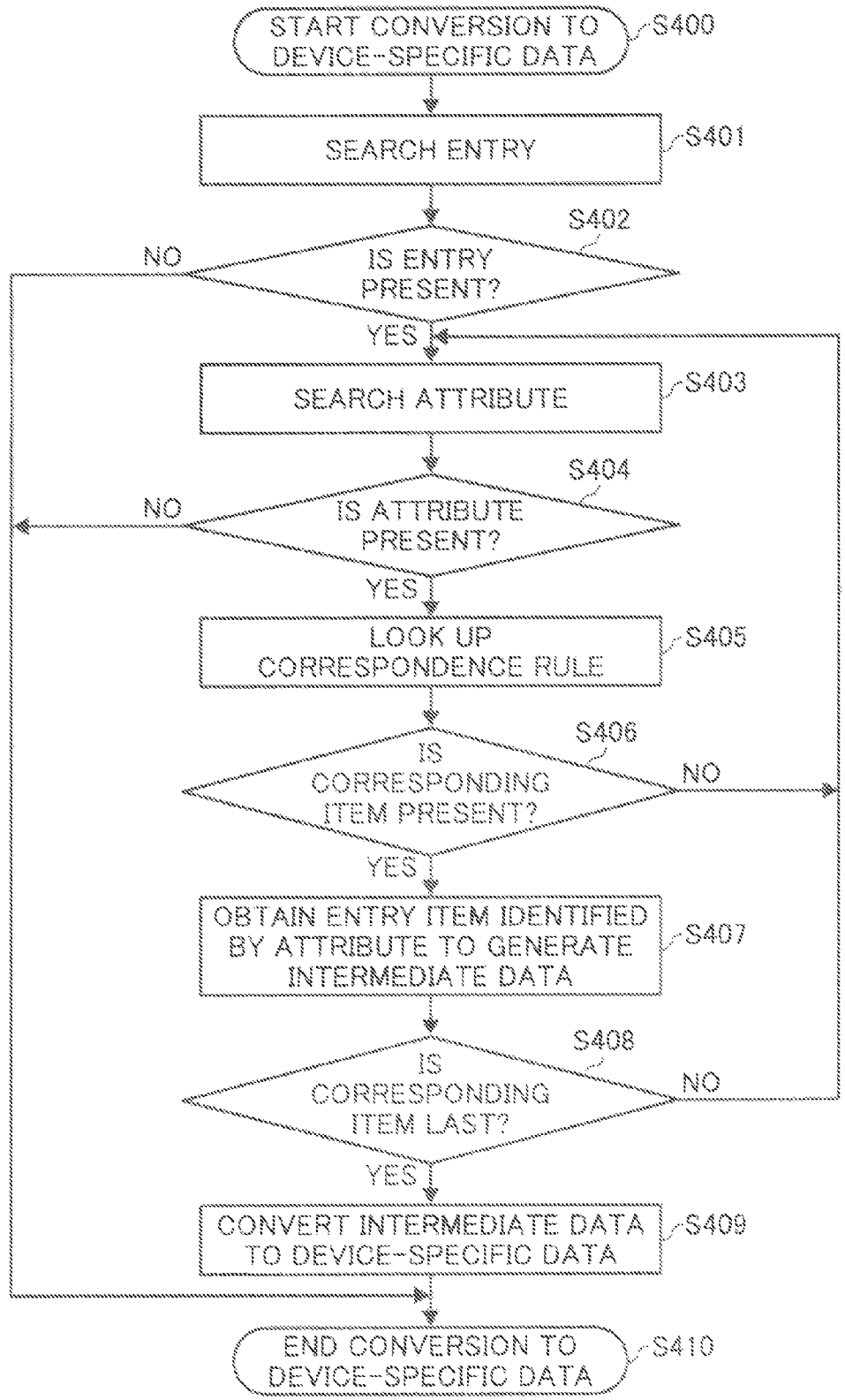
FIG. 11 is a flowchart of a process in which device-specific data is generated from the search results (LDAP_RAW data)

FIG. 11 depicts a sequence of a process of generating intermediate data and device-specific data performed by the text parser 74 with reference to the correspondence rule 80. The process in FIG. 11 starts at step S400, and then goes to step S401, where the LDAP_RAW data entry is searched for to determine at step S402 whether an entry is included. If no entry is included ("no"), the procedure branches to step S410, where the procedure ends.

If it is determined at step S402 that an entry is present ("yes"), the procedure branches to S403, where an attribute value is searched for. Then, it is determined at step S404 whether an attribute value is present. If no attribute is present ("no"), an indication of no search results is informed, or it is determined that some error has occurred. Then, the procedure branches to step S410 to end. On the other hand, if it is determined at step S404 that an attribute value is present ("yes"), the procedure goes to step S405, where the correspondence rule 80 is looked up to determine whether an item corresponding to the found attribute value is present. If it is determined at step S406 that no corresponding item is present ("no"), a read error may possibly occur if entry is taken as the intermediate data 76 and the device-specific data. Therefore, the procedure branches to step S403 to cause the next attribute value to be searched for.

On the other hand, if it is determined at step S406 that the corresponding item has been entered in the correspondence rule ("yes"), the entry item specified by the found attribute value at step S407 is obtained, and then the obtained entry item is written at a data position corresponding to the correspondence item and is registered as the intermediate data 76. At step S408, it is determined whether the process has reached the lowest entry of the entry items in the correspondence rule 80. If the process has reached the lowest entry ("yes"), the process branches to step S409, where the intermediate data 76 is started to be generated, and then the procedure ends at step S410. If the process has not reached the corresponding item process of the lowest entry in the correspondence rule 80 ("no"), the procedure branches to step S403, where the intermediate data 76 is generated until the corresponding item has been completed.

Figure 12:
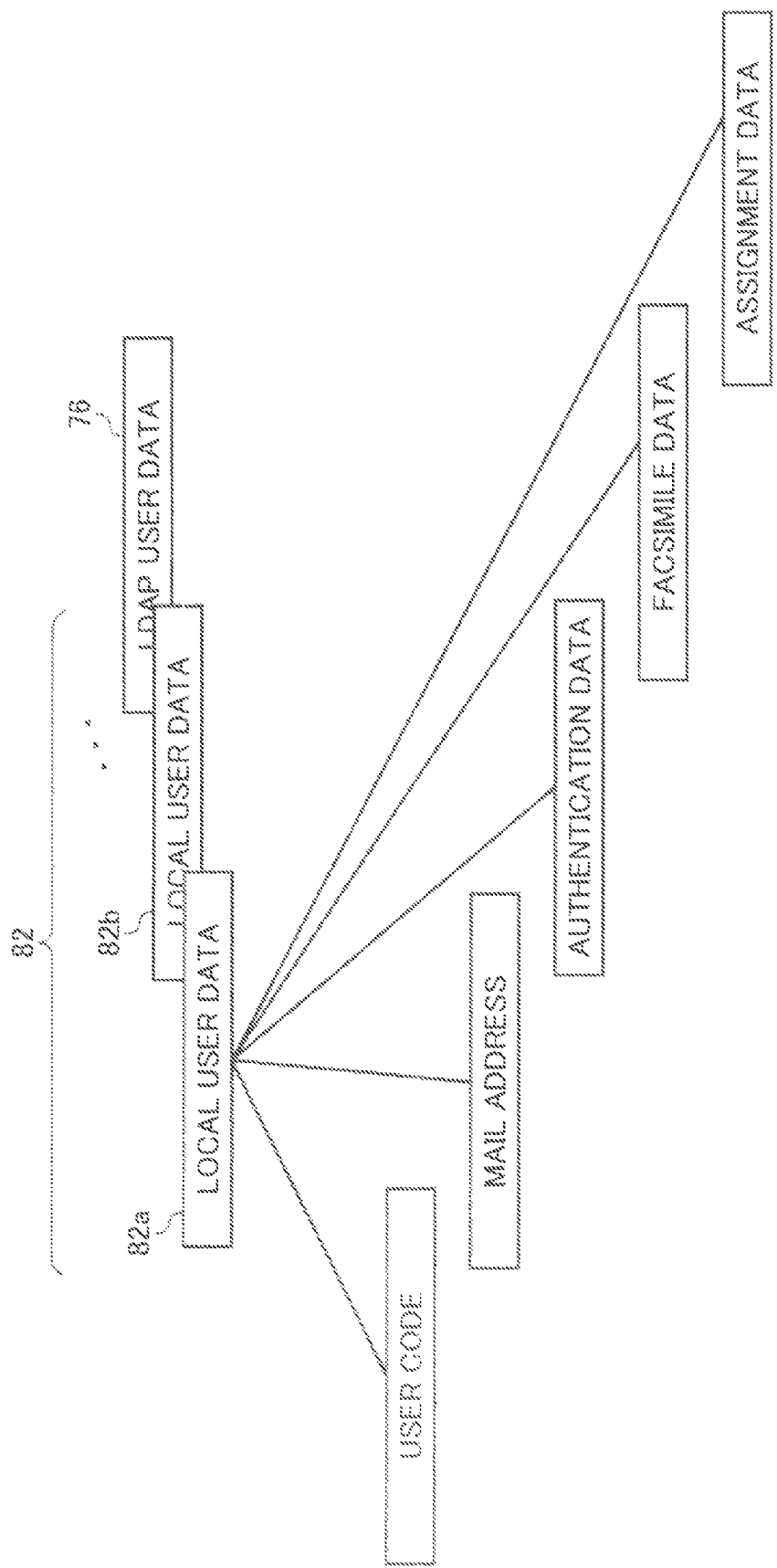
FIG. 12 is a drawing of local user data and LDAP user data containing the search results received from the LDAP server according the embodiment.

FIG. 12 is a drawing of local user data 82 and LDAP user data containing the search results received from the LDAP server according the embodiment. The local user data 82 can be stored in memory area as a table format, or as a structured document generated by the text editor or the like. The local user data 82 has registered therein user code (user ID and password), as well as authentication data, such as electronic signature or encryption key, facsimile data, assignment data (additional data), and others. These pieces of data are searched in response to an input of each search key from the user, and are displayed to the user. Also, the local user data 82 is registered as local user data 82*b*, for example, for each different entry ID.

Also, the intermediate data 76 is configured so that LDAP user data has entry items similar to those of the local user data, and these entry items are registered as the same device-specific data. Therefore, even when the user starts the address book from the image processing apparatus 10 for display, the LDAP user data can be displayed without preparing an additional application. In this case, an address display application performs processes of first generating an address book with reference to the local user data and then reading the LDAP user data for additional display as the address book.

Figure 13:
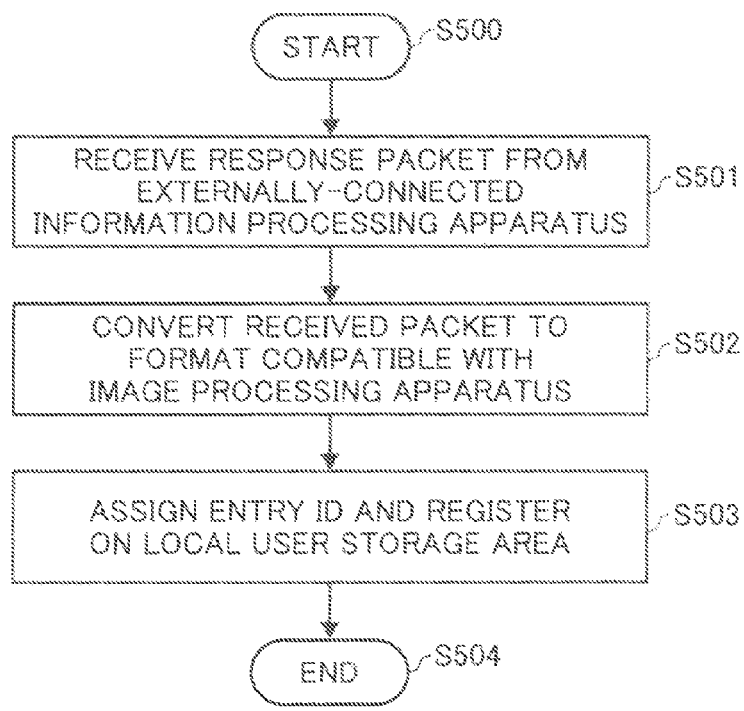
FIG. 13 is a flowchart of a process in which the user registers the search results received from the LDAP server in a nonvolatile storage device as local data.

FIG. 13 is a flowchart of a process in which the user registers the search results received from the LDAP server in the nonvolatile storage device as local user data. The process shown in FIG. 13 starts at step S500, and then at step S501, a response packet is received from the externally connected LDAP server. Then at step S502, the search results are read from the received response packet to generate an intermediate data file compatible with the image processing apparatus 10. At this stage, the image processing apparatus 10 can cause the address book to be displayed to the user through the user I/F. At step S503, an entry ID is assigned to each obtained intermediate data file, is registered in a local user storage area as nonvolatile data, and then the process ends at step S504. Here, in obtaining an entry ID, the highest-ranked entry ID of vacant entry IDs in the relevant local user storage area can be assigned.

Figure 14:
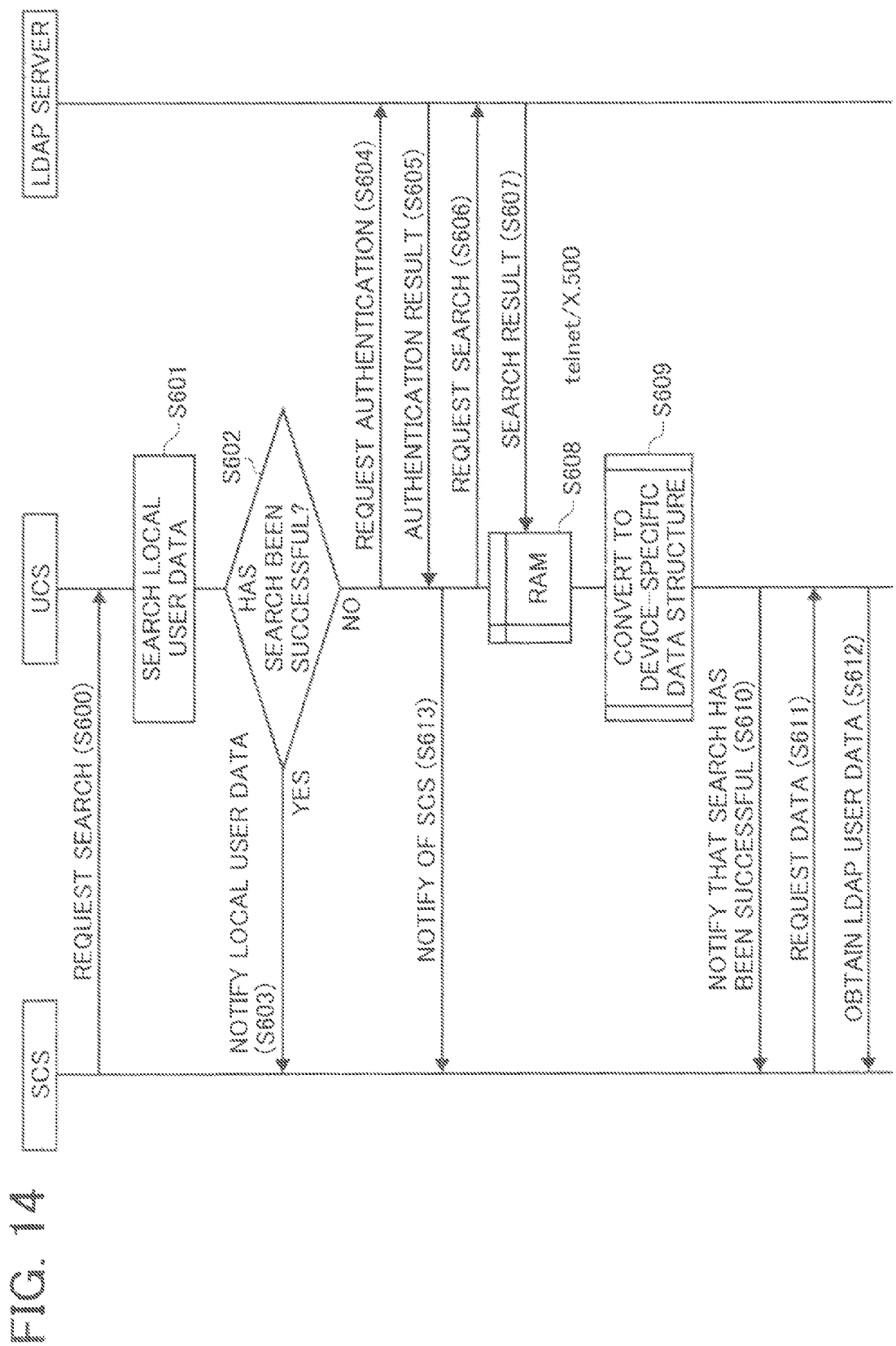
FIG. 14 is a drawing of a sequence of a transaction between an image processing apparatus and an LDAP server according to the embodiment.

FIG. 14 is a drawing of a process sequence when the user instructs the UCS 36 to search for the local user data according to the embodiment. In the sequence shown in FIG. 14, at step S600, the SCS 38 issues a search request to the UCS 36. The UCS 36 then searches at step S601 for the local user data. If the search for the local user data has been successful at step S602 ("yes"), the SCS 38 is notified of the local user data at step S603.

On the other hand, if the search for the local user data has not been successful at step S602 ("no"), the UCS 36 issues an authentication request to the LDAP server 18 at step S604, and then receives the authentication result at step S605. If authentication has been successful at step S602, a search request is issued to the LDAP server at step S606. Then at step S607, the corresponding search results are received. If the LDAP server 18 rejects the authentication request issued from the UCS 36, a notification as such is issued at step S613 to prompt the user to perform subsequent processing.

The search results received from the LDAP server 18 are stored at step S608 in a storage device, such as a RAM, and are converted at step S609 to a device-specific data structure. In the embodiment shown in FIG. 14, the search results are not stored in a nonvolatile storage device. Instead, a search success notification is immediately issued to the SCS 38 at step S610. The SCS 38 receiving the search success notification issues a data request to the UCS 36 at step S611, and then obtains the LDAP user data at step S612. The LDAP user data is then stored in the RAM for a predetermined period, and is then deleted in response to an event, such as a timeout, a device reset, or a transition to energy-saving mode of the device.

FIG. 15 is a drawing of a screen display displayed on the touch panel of the user I/F. The screen display shown in FIG. 15 is displayed when the user requests the LDAP server for registration. A screen display 90 has displayed thereon an area 92 on which names of available LDAP servers are displayed. Inside the area 92, fields 94 and 96 are displayed in which the names of the LDAP servers are displayed. The user selects one of the LDAP servers desired for registration from the fields 94 and 96 shown in FIG. 15. The screen display 90 also has displayed thereon an input field 98 for registration/change instruction, a field 100 for delete instruction, a field 102 for causing a new registration screen to be displayed, and a field 104 for closing the screen display 90, thereby allowing user's processing.

FIG. 16 is a drawing of the screen display 90 displayed when the user touches the new registration field 102 on the screen display 90 shown in FIG. 15 to generate an input event according to the embodiment. The screen display 90 shown in FIG. 16 has displayed thereon fields for entering the name of the user and the server name, a field of entering whether to perform an authentication process, a field for entering the user ID, and a field for password management. By entering inputs according to the screen display shown in FIG. 16, the user can specify an LDAP server for new registration, and can enter, in the information processing apparatus, user information to be registered on the LDAP server.

Figure 17:
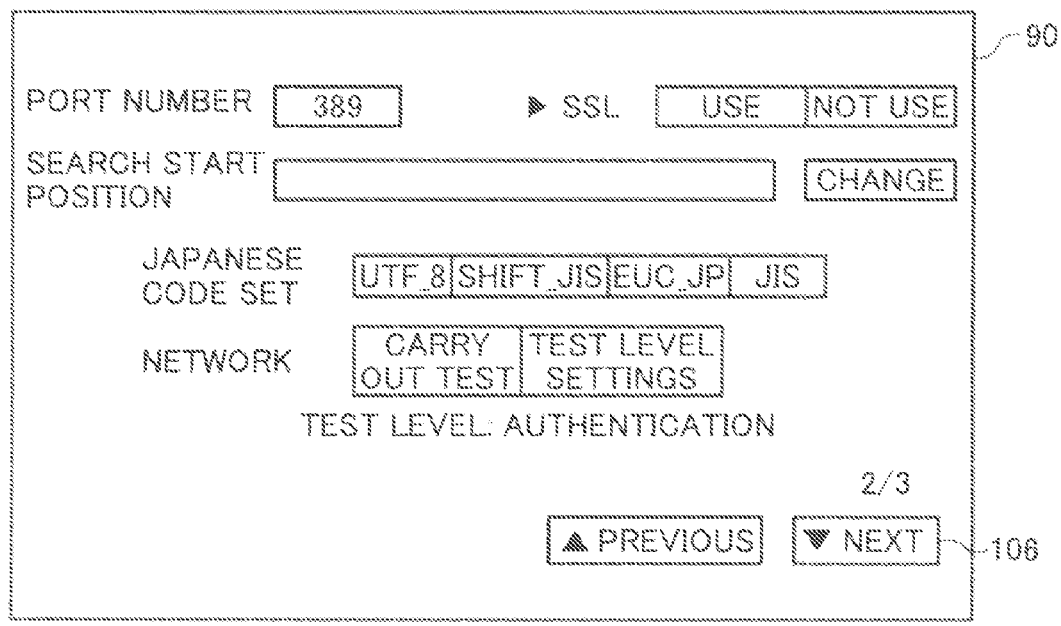
FIG. 17 is a drawing of a screen display displayed when the user touches a "next" field on the screen display shown in FIG. 16 to generate an input event.

FIG. 17 is a drawing of the screen display 90 displayed when the user touches a "next" field 160 on the screen display 90 shown in FIG. 16 to generate an input event. On the screen display 90 shown in FIG. 17, environment settings are performed for accessing the LDAP server during the new registration process. The screen display 90 has displayed thereon a port number indicating that an access is made to the LDAP server, an SSL condition setting field for selecting whether encryption communication is desired to be used, a field for environment setting of an encode set, a field indicating that a network environment test is to be performed, and a field for changing the level at the time of the test.

After environment settings through the fields shown in FIG. 17, when the user touches a field 106 to generate an input event, a further next page is displayed. An example of the next page to be provided may be a search data input screen on which a search key is displayed for searching when the test is successful. In the present invention, however, any screen display can be provided other than such a search data input screen.

Figure 18:
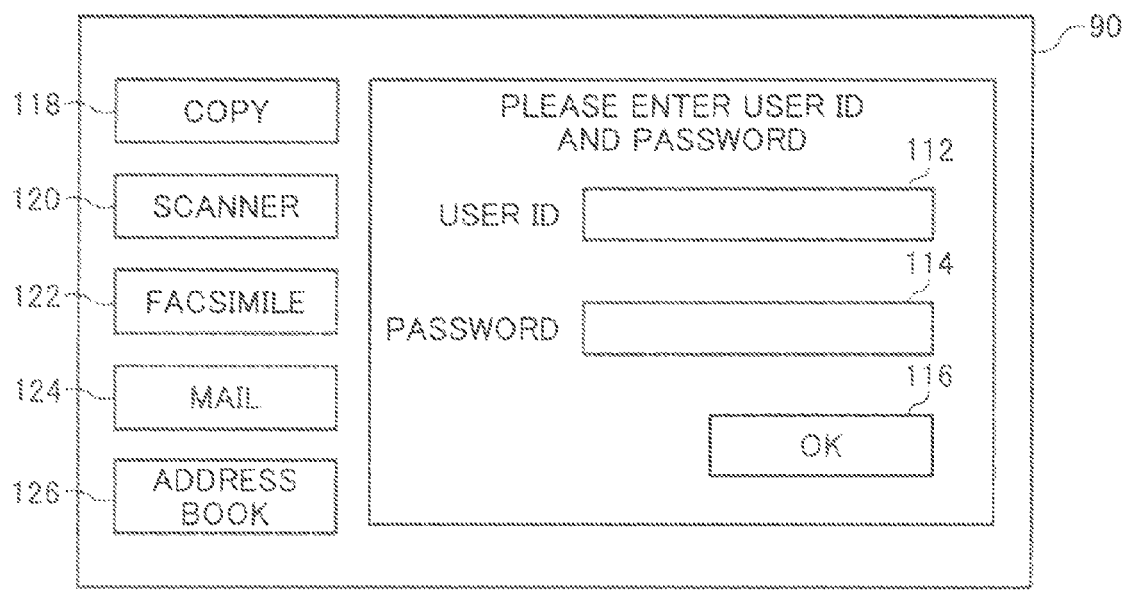
FIG. 18 is a drawing of a screen display presented to the user through the user I/F for the image processing apparatus to perform the process shown in FIG. 5.

FIG. 18 is a drawing of a screen display presented to the user through the user I/F for the image processing apparatus 10 to perform the process shown in FIG. 5 according to the embodiment. As shown in FIG. 18, the screen display 90 has provided thereon fields for the user to instruct execution of various applications in the image processing apparatus 10, such as a copy field 118, a scanner field 120, a facsimile field 122, a mail field 124, and an address book field 126. The screen display 90 also has provided thereon fields 112 and 114 for entering the user ID and the password, respectively, for user authentication. Upon completion of entering the user ID and the password, the user touches an "OK" field 116 to instruct the image processing apparatus 10 for processing the next screen.

Figure 19:
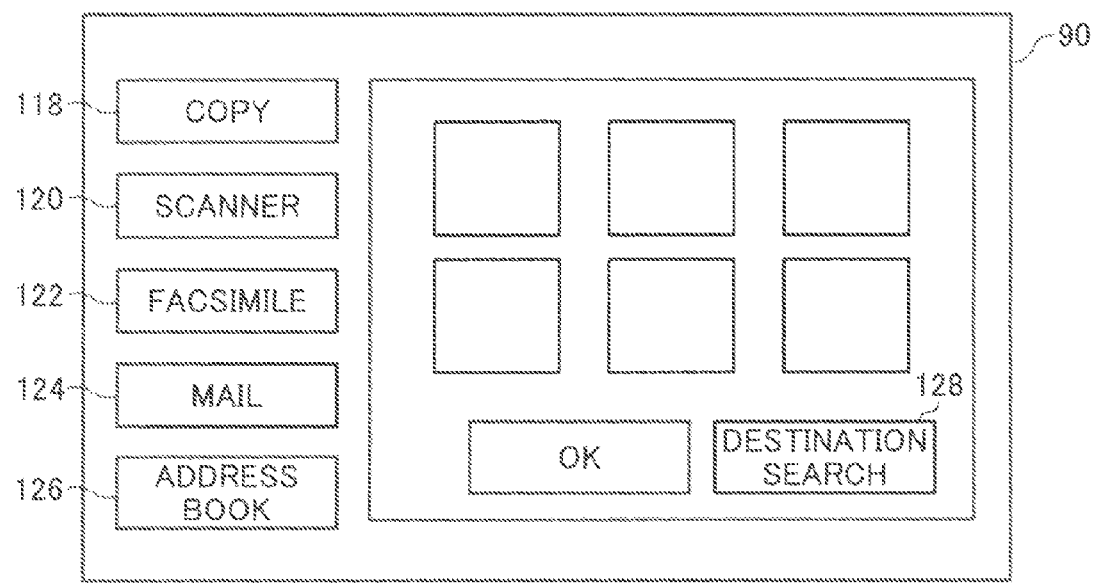
FIG. 19 is a drawing of a screen display displayed after the user enters a user identification (ID) and a password and touches an "OK" field for authentication by the image processing apparatus.

FIG. 19 is a drawing of the screen display 90 displayed after the user enters the user identification (ID) and the password and touches the "OK" field 116 for authentication by the image processing apparatus 10 according to the embodiment. The screen display 90 has displayed thereon the fields 118, 120, 122, 124, and 126 for instruction of the functions, such as copy, and further fields allowing selection of a menu item for the purpose of such instruction. At the same time, the screen display 90 has provided thereon a field 128 for instruction for destination search, thereby allowing the user to search for the local data in the image processing apparatus 10 and to search for the local data via the LDAP server.

Figure 20:
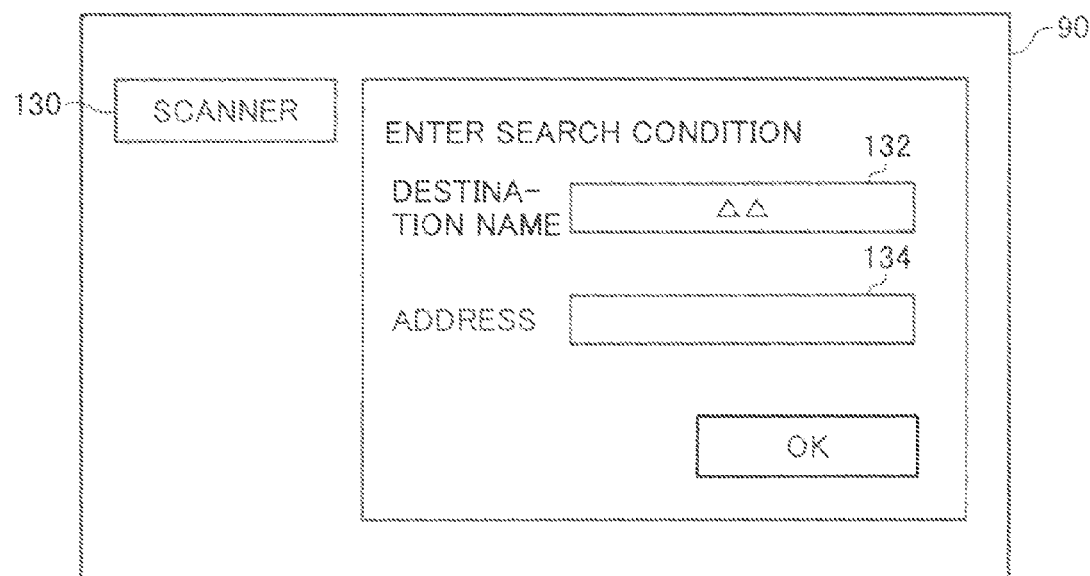
FIG. 20 is a drawing of a screen display displayed when the user touches a field for instructing a scanner application of the image processing apparatus from the screen display shown in FIG. 19.
Figure 21:
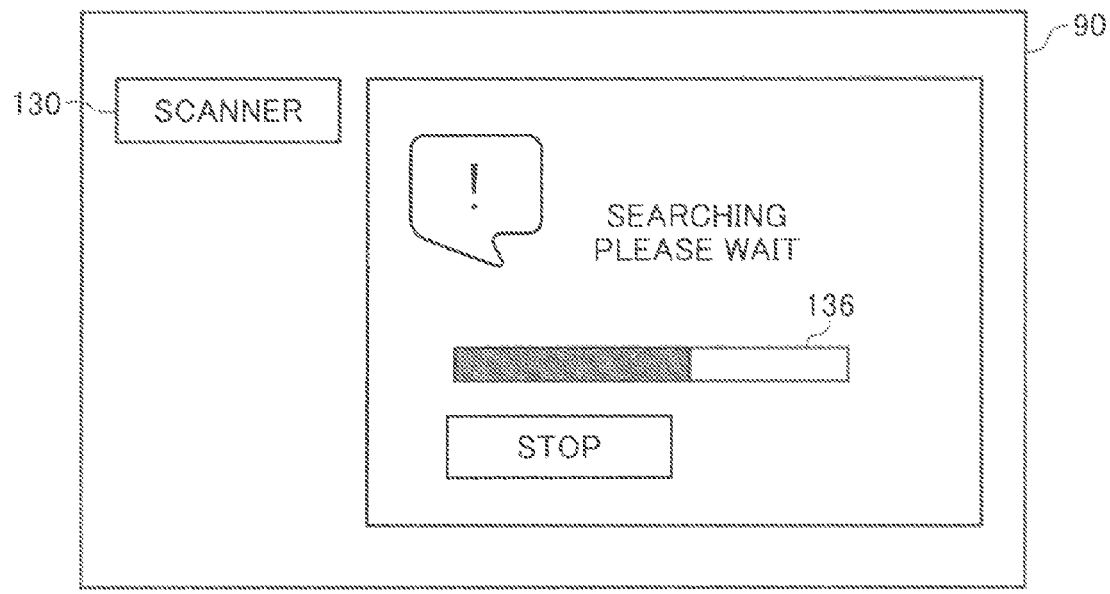
FIG. 21 is a drawing of a screen display for notifying the user that the image processing apparatus is currently searching.

FIG. 20 is a drawing of the screen display 90 displayed when the user touches the field 120 for instructing a scanner application of the image processing apparatus 10 from the screen display 90 shown in FIG. 19 and then touches the "destination search" field 128 for instruction for destination search. The screen display 90 shown in FIG. 20 has displayed thereon a field 130 indicating that the scanner application has been activated, thereby making the user recognize the application that is active at this time. The screen display 90 has also displayed thereon fields 132 and 134 for entering search conditions, thereby allowing the user to specify a search key and an attribute value registered on the image processing apparatus 10 or the LDAP server for searching. When the user enters desired search key, attribute value, and others, the image processing apparatus 10 starts an appropriate application to cause the screen display 90 shown in FIG. 21 to be displayed to the user, thereby notifying the user that the image processing apparatus 10 is currently in a search process.

The search process of the image processing apparatus 10 is now explained. The image processing apparatus 10 starts with searching for the local user data assigned to the authenticated user. If it is determined from the search results of the search key and the attribute value that no data corresponding to shared data and local data of the image processing apparatus 10 is present, a request packet including the search key and the attribute value is generated. The image processing apparatus 10 then connects to the LDAP server to transmit the request packet for requesting a search. Upon reception of the request packet, the LDAP server verifies that the user is authorized to access, and then performs a data search and sends a response packet including the search results to the IP address of the image processing apparatus 10.

Therefore, the user can obtain his or her necessary data without determining whether a search is performed on the image processing apparatus 10 or the LDAP server, and can visually recognize a search execution state. According to the embodiment, a bar display 136 indicative of the progress according to the actual search is presented to the user, thereby providing a prediction about time required for subsequent processing.

Figure 22:
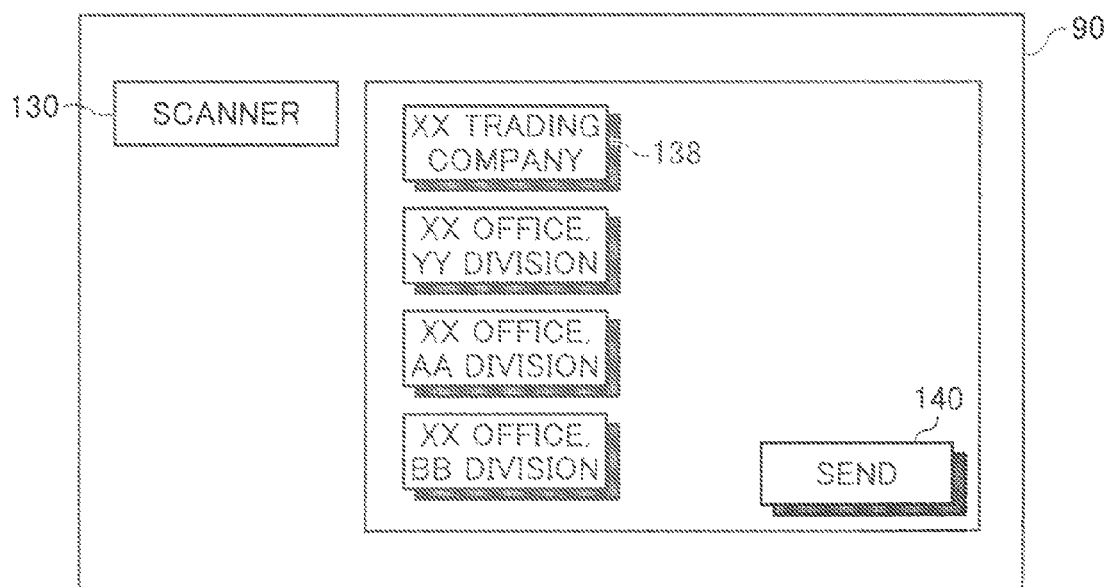
FIG. 22 is a drawing of the case where the search results obtained by the image processing apparatus are displayed as an address book according to the embodiment.

FIG. 22 is a drawing of the embodiment where the search results obtained by the image processing apparatus 10 according to the present invention are once stored as an intermediate data file in an appropriate memory area, and are then displayed as an address book. After selecting an address 138 displayed on the screen display 90 shown in FIG. 22, the user touches a "send" field 140, thereby transmitting an image obtained by the scanner as a mail or facsimile. At this time, during the time required for searching, the image processing apparatus 10 starts, for example, the scanner application, thereby driving the scanner to obtain transmission data.

Figure 23:
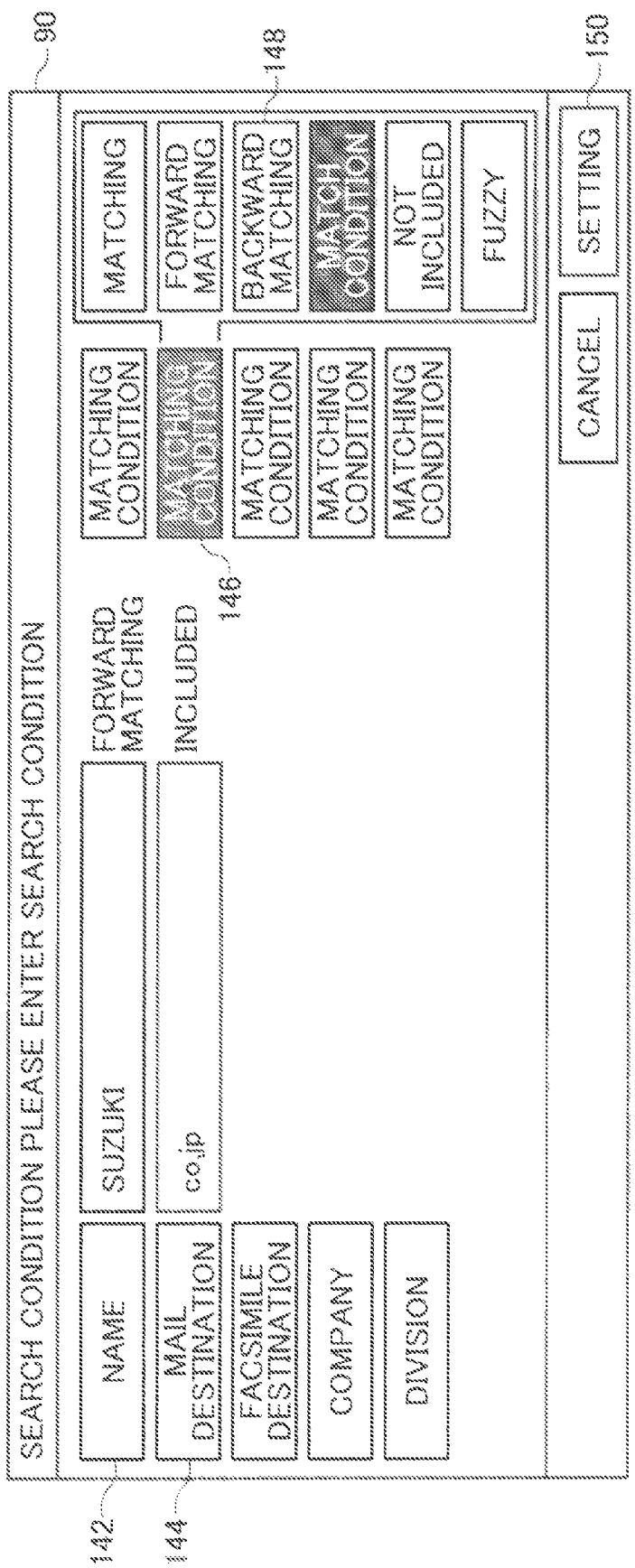
FIG. 23 is a drawing of a search condition input screen displayed by the image processing apparatus according to the embodiment.

FIG. 23 is a drawing of a search condition input screen displayed by the image processing apparatus 10 according to the embodiment. In the embodiment shown in FIG. 23, a name ("cn" or "sn") and a mail address are input in fields 142 and 144 displayed on the screen display 90. Also, a field 146 for specifying a condition for searching is displayed. By selecting a matching condition, a temporary display (or a pop-up display) 148 displaying selectable matching conditions is presented. The user enters a search condition formula through the screen display 90 shown in FIG. 23 and touches a "set" field 150, for example, thereby issuing a search request with search conditions set therein to the LDAP server 18.

Figure 24:
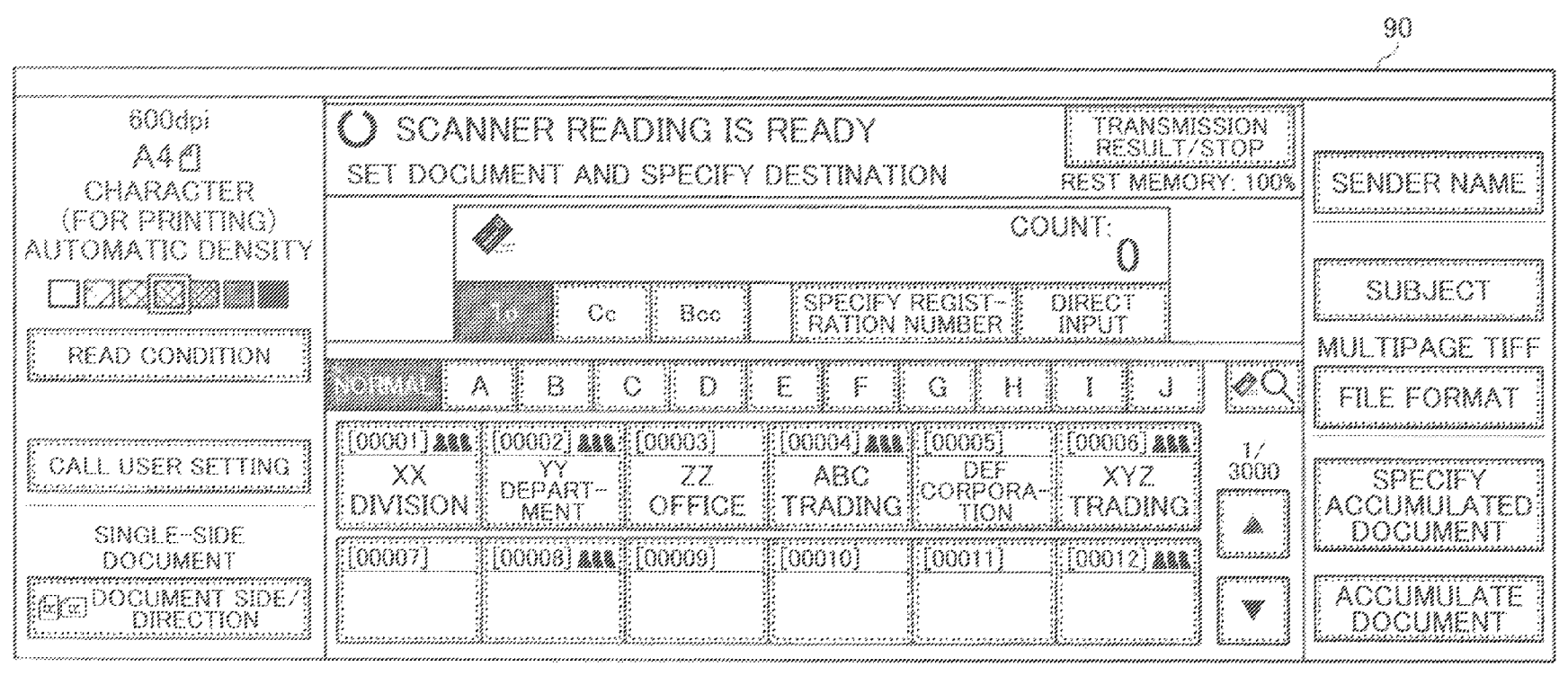

FIG. 24 is a drawing of an application function provided while the image processing apparatus 10 is searching according to another embodiment. In the embodiment shown in FIG. 21, an application indicating the search progress is started. In the embodiment shown in FIG. 24, by effectively using the fact that the image processing apparatus 10 is substantially in a wait state until receiving the search results, and the hardware resources are in an idle state, image data to be transmitted by using the search results from the LDAP server 18 is obtained. According to the present embodiment, after the user issues a search request to the LDAP server 18, the screen display 90 shown in FIG. 19 is displayed. When the user selects a start of the scanner application from the screen display shown in FIG. 19, a screen display shown in FIG. 24 is provided. While waiting for a response from the LDAP server 18, image data to be transmitted can be obtained.

In the present invention, by using the process explained above, the user can obtain his or her necessary data without performing a special process. Also, in the present invention, an intermediate data file compatible with the image processing apparatus is generated thereby for display as an address book. Therefore, irrespectively of the registration format at the LDAP server, the image processing apparatus can use data even those registered from a mobile terminal, such as a personal computer, a personal digital assistant (PDA), or a cellular phone. Furthermore, the image processing apparatus is efficiently functioned even while waiting for a response packet from an external information processing apparatus, such as the LDAP server, thereby increasing operation efficiency of the image processing apparatus.

Still further, the functions of the present invention explained above can be achieved by a device-executable program written in an object-oriented programming language, such as C, C++, Java (registered trademark) Beans, Java (registered trademark) Applet, Java (registered trademark) Script, Perl, or Ruby, and can be distributed as being stored in a device-readable recording medium.

Although the present invention has been explained with the embodiments depicted in the drawings, the present invention is not meant to be restricted to the embodiments depicted in the drawings. Other embodiments, additions, changes, and deletions can be made within a range that can occur to the person skilled in the art. Any embodiments are included within the scope of the present invention as long as the operations and effects of the present invention can be achieved.

According an aspect of the present invention, when the user searches for user data on the image processing apparatus, a determination is performed whether the user data has been registered in the image processing apparatus. When the user data has not been registered in the image processing apparatus, a search request is issued through a network to an externally-connected information processing apparatus, such as an LDAP server.

Upon accepting the search request from the information processing apparatus, the information processing apparatus obtains data corresponding to a search key from data managed by the information processing apparatus, and then returns the obtained data to the image processing apparatus issuing the search request. The image processing apparatus then converts the data to intermediate data usable therein, eliminates unnecessary attribute values, corrects displacement of entry items, and then causes the data to be displayed as an address book without additionally implementing a special program for causing the address book to be displayed. Therefore, the search results from the information processing apparatus can be used by the user irrespectively of in which format the data has been registered in the information processing apparatus.

Furthermore, according to an embodiment of the present invention, LDAP user data obtained from the LDAP server can be stored in an internal storage device of the image processing apparatus as local user data. Furthermore, in another embodiment, the LDAP user data can also be stored in a structure similar to that of the local user data and in a nonvolatile storage device, such as an SD card or USB memory, removably mounted on the image processing apparatus, together with a user-specific user code for use as security data. In the embodiment where the LDAP user data is stored in a volatile storage device removably mounted on the image processing apparatus, the data obtained from the LDAP server can be used by utilizing a different image processing apparatus without accessing the LDAP server in an occasional basis.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that communicates with an information processing apparatus externally connected through a network, the image processing apparatus comprising:

a converting unit that converts a search result of the information processing apparatus into device-specific data;

a user control unit that generates intermediate data to be displayed to a user as an address book, from the search result; and an application unit that provides a function of the image processing apparatus to the user, wherein the application unit provides the function to the user while the user control unit processes a search request for the information processing apparatus; and the user control unit performs an access control to the address book by using a user code of the device-specific data when the address book is displayed to the user, reads a portion corresponding to the intermediate data, and transfers the read portion to the application unit that displays the address book.

2. The image processing apparatus according to claim 1, wherein the image processing apparatus converts a search result downloaded from the information processing apparatus into the intermediate data, generates the device-specific data by coupling the user code for performing the access control to the address book with the intermediate data, and stores the generated device-specific data in a nonvolatile storage device of the image processing apparatus in response to the instruction from the user.

3. A computer program product comprising a non-transitory computer readable medium having computer-readable program codes embodied in the medium that when executed cause a computer to execute the steps of:

converting a search result of an information processing apparatus that is externally connected through a network into device-specific data;

generating intermediate data to be displayed to a user as an address book, from the search result;

providing a function of the image processing apparatus to the user, wherein the providing step includes providing the function to the user while a search request to the information processing apparatus is processed;

performing an access control to the address book by using a user code of the device-specific data when the address book is displayed to the user;

reading a portion corresponding to the intermediate data; and transferring the read portion to the application unit that displays the address book.

4. The computer program product according to claim 3, wherein the converting includes step converting a search result downloaded from the information processing apparatus into the intermediate data, and the generating step includes generating the device-specific data by coupling a user code for performing an access control to the address book with the intermediate data, and storing the generated device-specific data in a nonvolatile storage device of the image processing apparatus in response to an instruction from the user.

* * * * *